United States Patent
Katsuyama et al.

(10) Patent No.: US 7,397,954 B2
(45) Date of Patent: Jul. 8, 2008

(54) APPARATUS AND METHOD FOR ALLOWING IMAGES TO CORRESPOND TO EACH OTHER AND PROGRAM THEREFOR

(75) Inventors: Yutaka Katsuyama, Kawasaki (JP); Hiroaki Takebe, Kawasaki (JP); Noriaki Ozawa, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 10/336,763

(22) Filed: Jan. 6, 2003

(65) Prior Publication Data

US 2003/0179932 A1    Sep. 25, 2003

(30) Foreign Application Priority Data

Mar. 22, 2002    (JP)    ............................. 2002-080500

(51) Int. Cl.
*G06K 9/48* (2006.01)
(52) U.S. Cl. ..................................... 382/199
(58) Field of Classification Search ............... 382/189, 382/190, 281, 119; 434/350; 345/731, 648, 345/650–652, 443, 630, 636
See application file for complete search history.

(56) References Cited

U.S. PATENT DOCUMENTS

| | | | |
|---|---|---|---|
| 5,729,252 A | | 3/1998 | Fraser |
| 6,775,399 B1 * | | 8/2004 | Jiang ........................... 382/128 |
| 6,988,138 B1 * | | 1/2006 | Alcorn et al. ................ 709/225 |
| 7,010,178 B2 * | | 3/2006 | Moroo ........................ 382/313 |
| 2001/0011281 A1 * | | 8/2001 | Fry ............................. 707/500 |
| 2003/0016245 A1 * | | 1/2003 | Lee ............................. 345/762 |
| 2003/0081836 A1 * | | 5/2003 | Averbuch et al. ............ 382/199 |

FOREIGN PATENT DOCUMENTS

| | | |
|---|---|---|
| JP | 05-204990 | 8/1993 |
| JP | 07-319886 | 12/1995 |
| JP | 09-093530 | 4/1997 |
| WO | WO 02/01489 A1 | 1/2002 |

OTHER PUBLICATIONS

Sugata Mukhodpadhyay et al., "Passive Capture and Structuring of Lectures," Proceedings of ACM Multimedia 1999, pp. 477-487.
Syeda-Mahmood, "Indexing for topics in videos using foils," Proceedings 2000 IEEE Conference on Computer Vision and Pattern Recognition CVPR 2000, vol. 2 of 2, Jun. 13, 2000, pp. 312-319.
Rainer Lienhart, "Automatic Text Recognition for Video Indexing," Proceedings of ACM Multimedia 96, Nov. 18, 1999, pp. 11-20.
Communication with European Search Report dated Jun. 10, 2003 from the European Patent Office.
Full Translation of Japanese Patent Application No. 05-204990 (published on Aug. 13, 1993), and previously filed on Feb. 27, 2008.
Partial Translation of Japanese Patent Application No. 09-093530 (published on Apr. 4, 1997), and previously filed on Feb. 27, 2008.
Full Translation of Japanese Patent Application No. 07-319886 (published on Dec. 8, 1995), and previously filed on Feb. 27, 2008.

* cited by examiner

*Primary Examiner*—Brian Q Le
(74) *Attorney, Agent, or Firm*—Staas & Halsey LLP

(57) ABSTRACT

The present invention as disclosed hereby is to provide an apparatus and method for allowing images to correspond to each other and a program therefore to automatically perform or make synchronous correspondence of images. According to the apparatus on the condition that there are OHP files and a moving image photographing a lecture or the like using such OHP files, resemblances between the OHP files and OHP image regions of frame images constituting the moving image is calculated such that the correspondence processing between the OHP files and the frame images can be performed based on the calculated resemblances.

2 Claims, 21 Drawing Sheets

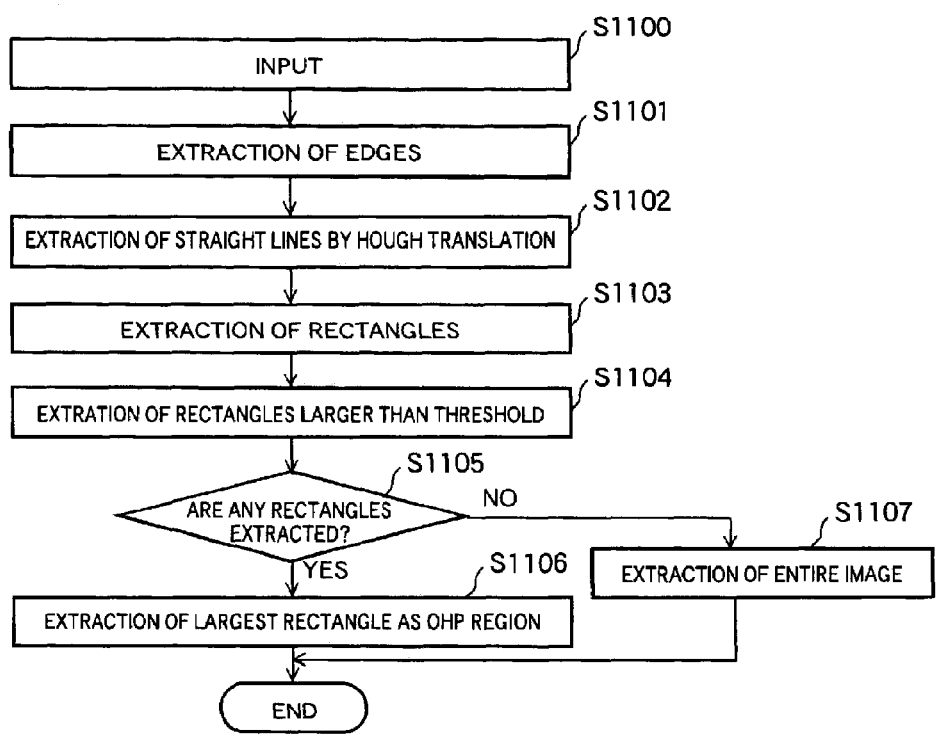
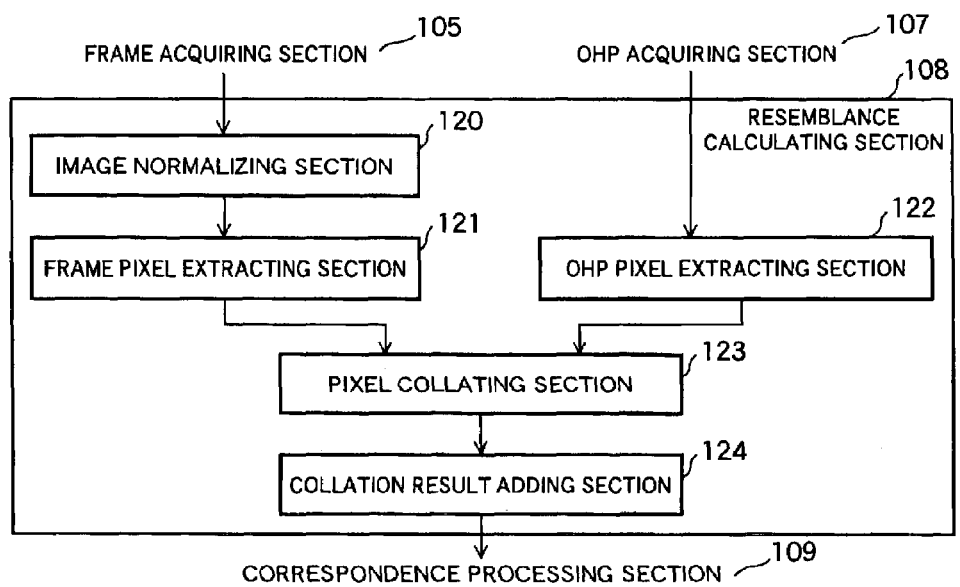

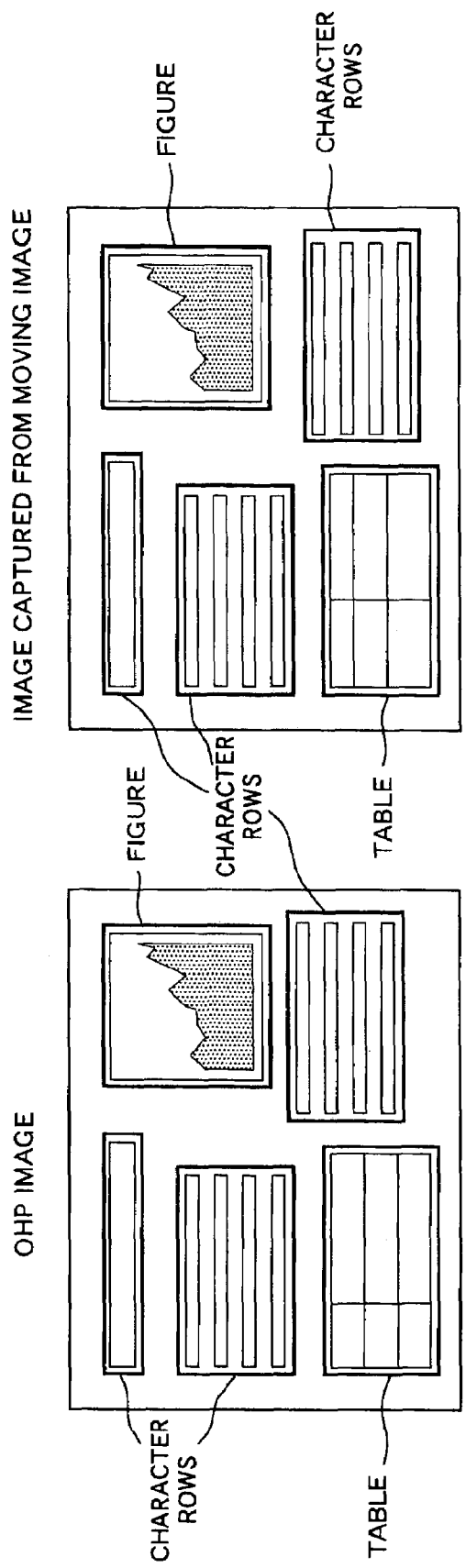

Fig.20

| ENTRY NO. | FRAME NO. | OHP NO. |
|---|---|---|
| 0 | 0 | 0 |
| 1 | 1 | 0 |
| 2 | 2 | 1 |
| 3 | 3 | 1 |
| 4 | 4 | 1 |
| 5 | 5 | 5 |
| : | : | : |
| N−1 | N−1 | 10 |
| N | N | 10 |

Fig.21

| ENTRY NO. | OHP NO. | STARTING FRAME NO. | ENDING FRAME NO. |
|---|---|---|---|
| 0 | 0 | 0 | 1 |
| 1 | 1 | 2 | 4 |
| : | : | : | : |
| M | 10 | N−5 | N |

Fig.27

| FRAME NUMBER: | 0 | 1 | 2 | 3 | 4 | 5 | 6 | 7 | 8 | 9 | 10 | 11 | 12 | 13 | ... |
|---|---|---|---|---|---|---|---|---|---|---|---|---|---|---|---|
| OHP NUMBER: | 0 | 0 | 0 | 0 | 0 | 0 | 0 | 0 | 1 | 1 | 1 | 1 | 2 | 2 | ... |

C1   C2   C5 C4   C3

APPARATUS AND METHOD FOR ALLOWING IMAGES TO CORRESPOND TO EACH OTHER AND PROGRAM THEREFOR

BACKGROUND OF THE INVENTION

1. Field of the Invention

The present invention relates to an apparatus and method for allowing images to correspond to each other and a program therefore to automatically perform or make correspondence between a plurality of first images (e.g., an OHP (Overhead Projector) files as used in a lecture or the like) and a plurality of second images (e.g., a moving image of a plurality of frames obtained by photographing such a lecture).

2. Description of the Related Art

In a field of an interoffice education or in a field of a general education, the E-learning is being introduced thereinto. For example, the E-learning includes a remote education that is conducted by computers using the Internet or the like and often using WEB image screens. The E-learning is embodied miscellaneously in its form. Among others, particularly such contents as being employed in a lecture which is usually conducted and actively engaged in practical educations can be reproduced on a computer in the best mode and used for synchronously performing both of a reproduction of the lecture by using a moving image thereof and an enlarged representation of an OHP image used in the lecture (hereinafter, an image projected or displayed by the OHP is also referred to as an OHP file or OHP image). With the contents as mention above, participants can readily identify which part of the OHP image is pointed out by a lecturer on a monitor of the computer and comprehend its details definitely by watching its enlarged representation. Basically, such contents can effectuate simultaneous representations of the part pointed out by the lecturer on the OHP image and of its details, thereby providing substantially the same circumstance as that in which the participant is actually participated in the lecture.

In order to realize such a system, it is necessary to synchronize the moving image representation of the lecture using the OHP with the enlarged representation of the OHP image which is projected partially in the moving image. For creating such contents, various authoring systems (authoring softwares) for contents creation of the E-learning are commercially available at present.

However, a processing for performing correspondence between the moving image and a representation of a document of educational-materials in a synchronous manner to each other is manually done by an operator at present. Accordingly, there is a problem arising from a lot of time which must be expensed for creating the contents.

SUMMARY OF THE INVENTION

In order to address such a problem, the present invention is accomplished and its objection is to provide an apparatus and method for allowing images to correspond to each other and a program therefore to automatically perform correspondence between opposite images in a synchronous manner to each other.

According to an aspect of the present invention, an apparatus for allowing images to correspond to each other comprises:

based a plurality of first images and a plurality of second images including at least one having a predetermined relevance to any one or more of the first images, relevance deciding means for deciding which of the first images has the predetermined relevance to each of the second images; and correspondence processing means for making correspondence between the any one or more of the first images which have been decided as one or ones having the predetermined relevance by the relevance deciding means and each of the second images.

With the configuration as above, it is possible to readily perform correspondence between the first images and the second images. As a result, for example during creation of contents for use in the E-learning, a correspondence processing which has manually been conducted can automatically be performed, thereby providing a significant reduction of time required for the creation of contents for use in the E-learning.

In an embodiment of the present invention, the relevance deciding means is comprised of a frame acquiring section, an OHP acquiring section and a resemblance calculating section while the correspondence processing means is comprised of a correspondence processing section.

According to another aspect of the present invention, the apparatus is characterized in that, in the event that the predetermined relevance resides in that any one of the first images is included in any one of the second images, the relevance deciding means comprises:

predetermined region extracting means for extracting a predetermined region from the second image; and corresponding image deciding means for deciding which of the first images corresponds to an image of the predetermined region extracted by the predetermined region extracting means.

With the configuration as above, upon performing correspondence between a moving image and OHP images so as to create contents for use in the E-learning which is reproduced with synchronization between the OHP images and the moving image of a lecture or the like using an OHP, it is possible to readily extract from the moving image a region on which at least one of the OHP images is projected and then readily decide which of the OHP images corresponds to an image of the extracted region.

In an embodiment of the present invention, the predetermined region extracting means is comprised of an OHP region extracting section while the corresponding image deciding means is comprised of the resemblance calculating section and the correspondence processing section.

According to yet another aspect of the present invention, the apparatus is characterized in that the corresponding image deciding means comprises resemblance calculating means for calculating a resemblance between the predetermined region image and the first images, and is adapted to decide which of the first images corresponds to the predetermined region image based on resemblances calculated by the resemblance calculating means.

With the configuration as above, the resemblance between the predetermined region image and the first images is calculated and used such that the first images can be allowed to correspond to the second image with a high degree of reliability. In an embodiment of the present invention, the resemblance calculating means is comprised of a resemblance calculating section.

According to yet another aspect of the present invention, the apparatus is characterized in that the resemblance calculating means is adapted to calculates resemblances of all of the first images with the predetermined region image and then obtain corresponding candidates of the first images with respect to the predetermined region image based on the resemblances.

With the configuration as above, it is possible to allow the first images to correspond to the second image with high certainty.

According to yet another aspect of the present invention, the apparatus is characterized in that the first image is of a rectangular shape and included in a part of the second image, the predetermined region extracting means being adapted to detect any straight line components from the second image and further detect the rectangular shape as the predetermined region based on the detected straight line component.

With the configuration as above, the region on which the first image is projected can be detected from the second image with certainly such that a reliability of the correspondence processing between the first images and the second images. In an embodiment of the present invention, the predetermined region is intended to indicate a region on which an OHP image is projected and which is included in a frame image constituting the moving image.

According to yet another aspect of the present invention, the apparatus is characterized in that the predetermined region extracting means is adapted to perform an edge extraction processing in the second image when the straight line components are detected to create an edge binarized image such that the Hough translation is applied to the resultant edge binarized image.

With the configuration as above, straight line components can be detected in the second image with a high degree of accuracy so that the predetermined region can be readily detected.

According to yet another aspect of the present invention, the apparatus is characterized in that the predetermined region extracting means is adapted to integrate the extracted straight line components to detect rectangles and extract the maximum one of the detected rectangles as the predetermined region.

With the configuration as above, upon performing correspondence between OHP images and a moving image of a lecture or the like using the OHP, the maximum one of rectangular regions which are projected on the moving image is usually regarded as an OHP region and therefore it is possible to extract the region on which the OHP image is projected from the moving image with ease and certainty by detecting such a maximum rectangle in the moving image.

According to yet another aspect of the present invention, the apparatus is characterized in that said resemblance calculating means is adapted to collate a plurality of pixels constituting said predetermined region image extracted by said predetermined region extracting means with a plurality of pixels constituting each of said first images, thereby calculating resemblances based on that collation results.

With the configuration as above, the resemblance between the first images and an image which is a part of the second image and applicable to each of the first images can readily be calculated and therefore the correspondence processing between the first images and the second images can be expedited.

According to yet another aspect of the present invention, the apparatus is characterized in that said resemblance calculating means comprises image-size varying means for an image-size of either one of said predetermined region image and said first image, thereby performing said collation in such a varied size condition.

With the configuration as above, it is possible to perform the collation between images whose sizes are coincided with each other and therefore an accuracy of the resemblance to be calculated can be enhanced. In an embodiment of the present invention, the image size varying means is comprised of an image normalizing section in the resemblance calculating section.

According to yet another aspect of the present invention, the apparatus is characterized in that said resemblance calculating means comprises character recognizing means for recognizing any characters included in an image, and then is adapted to calculate said resemblance based on characters recognized in said image of said predetermined region which is extracted from said second image by said predetermined region extracting means and characters recognized, oppositely to the former characters recognized in said predetermined region image, in said first image.

With the configuration as above, it is possible to readily calculate a resemblance between the first images and an image which is applicable to each of the first images in the second image by the character collation as above and therefore the correspondence processing between the first images and the second images can be expedited. In an embodiment of the present invention, the character recognizing means is comprised of a frame character extracting section and an OHP character extracting section.

According to yet another aspect of the present invention, the apparatus is characterized in that said resemblance calculating means is adapted to perform the collation of all pairs of opposite characters recognized on mutually corresponding locations in said predetermined region and said first image, thereby calculating the resemblance based on that collation result.

Furthermore, according to another aspect of the present invention, the apparatus is characterized in that said resemblance calculating means is adapted to perform the collation of all pairs of oppositely continuous predetermined-number characters recognized on mutually corresponding locations in said predetermined region and said first image, thereby calculating the resemblance based on that collation result.

With the configurations as above, the resemblance can be calculated with a high degree of accuracy.

According to yet another aspect of the present invention, the apparatus is characterized in that said resemblance calculating means comprises layout information detecting means for detecting layout information included in an image, and then is adapted to calculate the resemblances based on layout information included in said predetermined region image extracted by said predetermined region extracting means and layout information included in each of said first images, both layout information being respectively detected by said layout information detecting means.

With the configuration as above, it is possible to readily calculate the resemblance between an image which is applicable to each of the first images in the second image and each of the first images and therefore the correspondence processing between the first images and the second images can be expedited. In an embodiment of the present invention, the layout information detecting means is comprised of a frame layout acquiring section and an OHP layout acquiring section.

According to yet another aspect of the present invention, the apparatus is characterized in that said layout information includes at least one information of an attribute of said predetermined region, a placement situation of said predetermined region and a feature quantity of said predetermined region. Further, said attribute information of said predetermined region contains at least one attribute value of a figure, a table, a block of character rows and each character row in the block of character rows. Furthermore, said feature quantity of said predetermined region contains at least one information of a position of a rectangle enclosing a character row, a size of character row, a shape of a character row and a color of a character row.

With the configuration as above, it is possible to calculate the resemblance by performing a collation processing using various layout information and therefore an accuracy of the resemblance to be calculated can be enhanced.

According to yet another aspect of the present invention, the apparatus is characterized in that said feature quantity regarding a plurality of color information per character row which are detected by said layout information detecting means is representative color information obtained by subjecting said plurality of color information per character row to clustering processing.

With the configuration as above, in the event that a plurality of colors exist in the character row, such colors are aggregated to derive a representative color to be used for the collation processing and therefore the collation processing using character colors can be facilitated.

According to yet another aspect of the present invention, the apparatus is characterized in that said second images correspond to frame images of a plurality of continuous frames constituting a moving image, in the event that two of said first images corresponding to two frame images which are apart a certain number of frames from each other are identical to each other, said correspondence processing means being adapted to allocate to frame images existing between said two frame images the same images as said two of said first images.

According to yet another aspect of the present invention, the apparatus is characterized in that said second images correspond to frame images of a plurality of continuous frames constituting a moving image, said apparatus further comprising frame image roguing means for extracting a frame image from images of said continuous frame every a predetermined range (or interval) such that said relevance deciding means can decide relevances between said first images and images of said frames rogued by said frame roguing means.

With the configuration as above, frame images existing between the two discontinuous frame images having common relevance to the first images are enabled to have the same relevance as that common relevance even if all of the continuous frame images are not decided in relevance to the first images and therefore the correspondence processing can be simplified and facilitated. In an embodiment of the present invention, the frame image roguing means is comprised of the frame acquiring section and the correspondence processing section.

According to yet another aspect of the present invention, the apparatus is characterized in that two of said first images which are allowed to correspond to two frame images extracted by said frame image roguing means with the predetermined frame range therebetween are not identical to each other, said apparatus further comprising roguing range varying means for reducing a frame range rogued by said frame image roguing means.

With the configuration as above, if the rogued two frame images have different relevances, it is possible to reduce a frame range to be rogued smaller than the above-mentioned two frame range so that any frame images having the same relevance can readily retrieved. In an embodiment of the present invention, roguing range varying means is comprised of the frame acquiring section and the correspondence processing section.

According to yet another aspect of the present invention, the apparatus is characterized in that said second images correspond to frame images of a plurality of continuous frames constituting a moving image, said apparatus further comprising point detecting means for detecting a point before and behind which two of said first images differentiate from each other in correspondence with two frame images before and behind that point, said correspondence processing means being adapted to allocate the same first image to respective frame image between two points detected by said point detecting means.

With the configuration as above, it is possible to detect a point from which the correspondence processing is changed and therefore the correspondence processing can readily be performed in response to detection of the point.

According to yet another aspect of the present invention, the apparatus is characterized in that said second images correspond to frame images of a plurality of continuous frames constituting a moving image, in the event that said frame images which are substantially allowed to correspond to the same first image include some frame images less than a predetermined number and not allowed to correspond to the same first image, said correspondence processing means being adapted to allow said some frames to correspond to the same first image.

With the configuration as above, in the event that certain continuous frame images included in a moving image photographing a lecture or the like using an OHP and allowed to correspond to the same OHP file contains some frame images existing over a short range therein and having different correspondences from that same OHP file, the certain continuous frame images all over can appropriately be allowed to correspond to the same OHP file by canceling the different correspondences over such a short range.

According to yet another aspect of the present invention, the apparatus is characterized in that said second images correspond to frame images of a plurality of continuous frames constituting a moving image, said correspondence processing means being adapted to allow a frame image which has not been decided as one having the predetermined relevance to a first image by said relevance deciding means to correspond to the same first image as one having the predetermined relevance to a frame image immediately before or behind said first mentioned frame.

With the configuration as above, in the event that, upon performing correspondence between a moving image photographing a lecture or the like using an OHP and OHP images, some of the OHP images are not projected on frame images partially constituting the moving image, it can be prevented not to extract those OHP images corresponding to those frame images so as to resolve the problem of creation of discontinuous OHP images in order to correspond to those frame images.

According to yet another aspect of the present invention, the apparatus is characterized in that said second images constitute a moving image photographed by photographing means, said first images being photographed by said photographing means and included in a predetermined region in each of said second images of the moving image.

According to yet another aspect of the present invention, the apparatus is characterized in that said first images are images projected by an OHP, said second images each having a predetermined region therein on which said first images are projected.

Further, according to another aspect of the present invention, there is provided a method for allowing images to correspond to each other, comprising the steps of:

based a plurality of first images and a plurality of second images including at least one having a predetermined relevance to any one or more of said first images, deciding which of said first images has the predetermined relevance to each of said second images; and making correspondence between said any one or more of said first images which have been decided as one or ones having the predetermined relevance at deciding step and each of said second images.

Furthermore, according to another aspect of the present invention, there is provided a program, stored in a computer-readable medium, for allowing images to correspond to each other and for allowing a computer to perform an image correspondence processing, comprising the steps of:

based a plurality of first images and a plurality of second images including at least one having a predetermined relevance to any one or more of said first images, deciding which of said first images has the predetermined relevance to each of said second images; and making correspondence between said any one or more of said first images which have been decided as one or ones having the predetermined relevance at deciding step and each of said second images.

In addition, according the present invention, it will be appreciated by those of ordinary skill in the art that the computer-readable medium also comprises either one of a CD-ROM, a flexible disk (FD), a DVD disk, an opto-magnetic disk, an IC card and the like, a data base storing computer programs, the other computer or its data base, or a transmission medium on a transmission line.

BRIEF DESCRIPTION OF THE DRAWINGS

FIG. 5 is a flow chart showing a flow of an extraction processing of an OHP region image;

FIG. 6 is a schematic functional configuration of a resemblance calculating section adapted to calculate a resemblance in terms of pixels;

FIGS. 13(a) and 13(b) illustrates an example of the layout information;

FIG. 20 illustrates one example of a frame number-to-OHP number correspondence table;

FIG. 21 illustrates a table indicating OHP images and corresponding frame ranges;

FIG. 27 illustrates a specific collation processing example implemented along the line of the flow chart as shown in FIG. 26.

PREFERRED EMBODIMENT OF THE PRESENT INVENTION

In the following detailed description of preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense, and the scope of the present invention is defined by the appended claims.

Hereinafter, a preferred embodiment according to the present invention will be described in detail with reference to the accompanying drawings.

Figure 1:
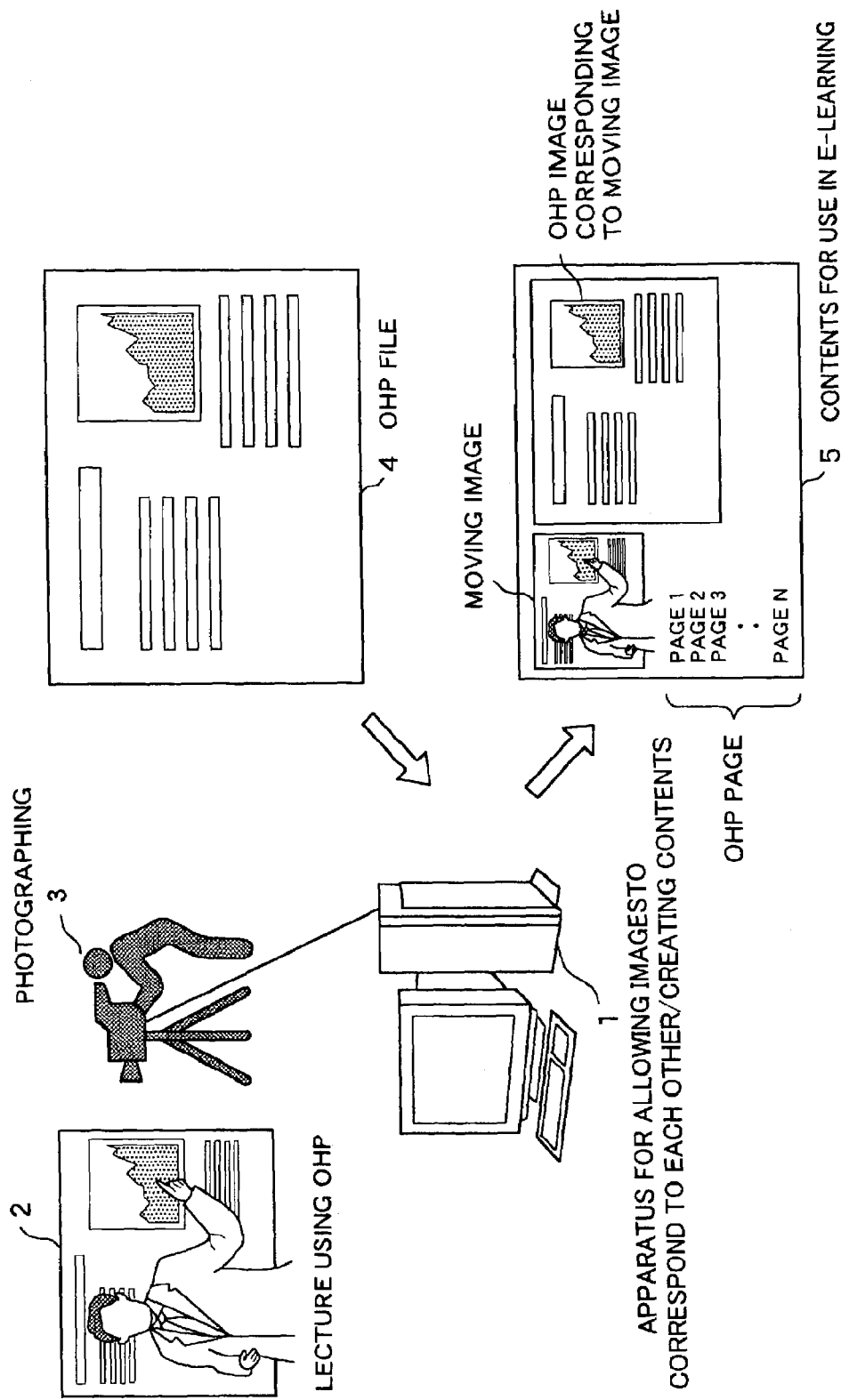
FIG. 1 is a conceptual view showing an overall system for allowing images to correspond to each other according to an embodiment of the present invention.

FIG. 1 is a conceptual view showing an overall system for allowing images to correspond to each other according to the embodiment of the present invention. First of all, in the event that a lecture 2 conducted by using an OHP is used as a teaching material, the lecture scene is photographed in the form of a moving image by a camera 3 so as to store the moving image in an apparatus 1 for allowing images to correspond to each other/creating contents. Separately, files 4 of the OHP (or OHP files 4) used in the lecture are also stored in the same apparatus (the apparatus 1 for allowing images to correspond to each other/creating contents).

In the apparatus 1 for allowing images to correspond to each other/creating contents, switching timing points of OHP images in the moving image are sought by using various image processing technologies and then a correspondence table capable of indicating which of frames in the moving image corresponds to any OHP image is created. Further, the apparatus 1 for allowing images to correspond to each other/creating contents, based on this correspondence table, creates contents 5 as used in the E-learning by which the moving image and the OHP images are synchronously reproduced. Thus, it is enabled to automatically perform a correspondence operation for making a correspondence between the moving image and respective pages in the OHP. Although such a correspondence operation has manually been conducted in the prior art, desired contents can readily be achieved according to the present invention. In particular, it should be noted that the creation of the above-mentioned "correspondence table" within the apparatus 1 for allowing images to correspond to each other/creating contents is pertinent to the present invention. However, the preferred embodiment according to the present invention will be described in detail by exemplifying an apparatus even including a function for creating desired contents based on the above-mentioned "correspondence table".

Embodiment 1

Figure 2:
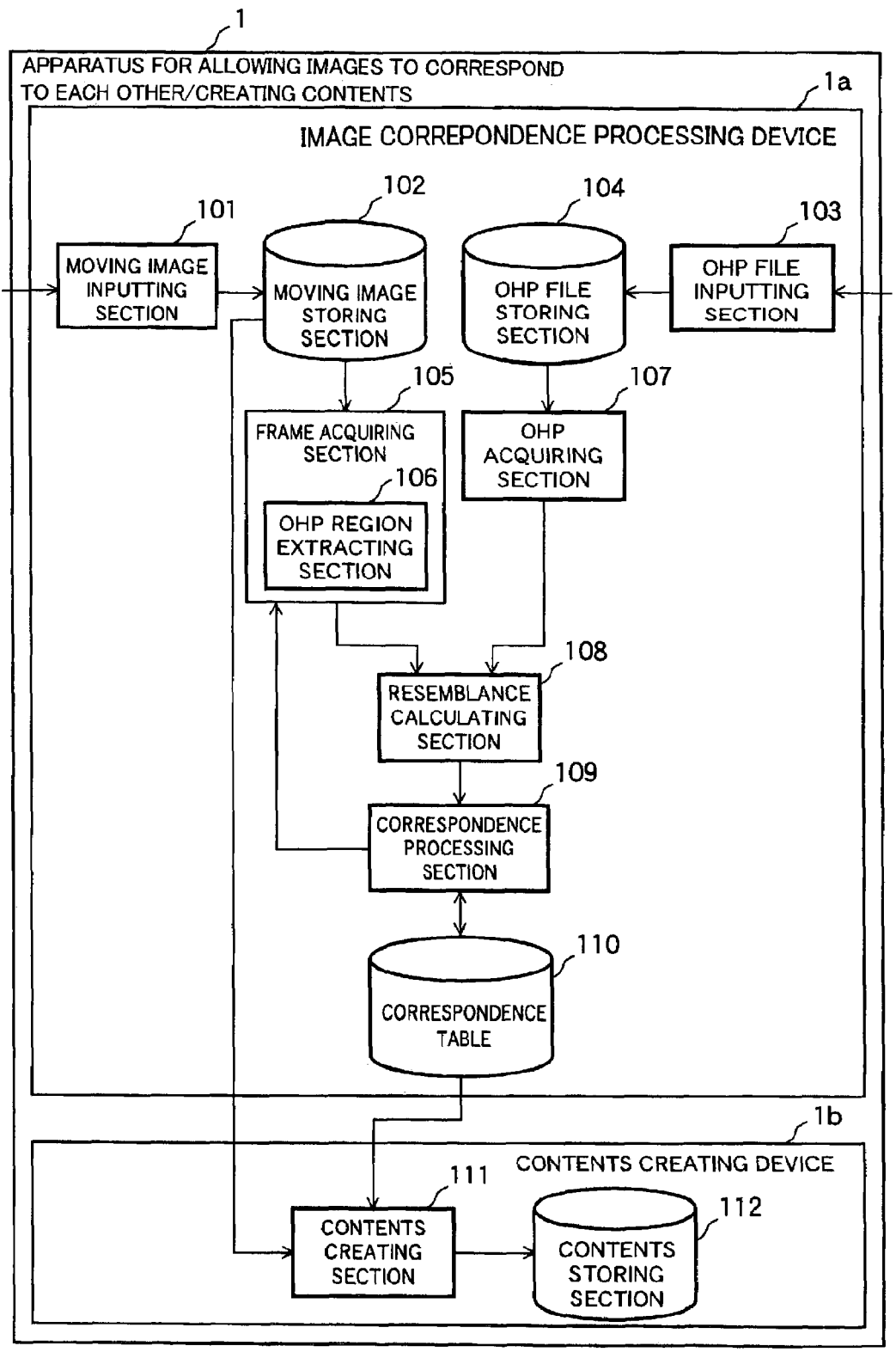
FIG. 2 is a schematic functional configuration of an apparatus for allowing images to correspond to each other/creating contents according to a preferred embodiment of the present invention.

FIG. 2 is a schematic diagram showing an example of functional configuration of the apparatus 1 for allowing images to correspond to each other/creating contents as mentioned above. As shown in FIG. 2, the image correspondence/contents creating apparatus 1 is comprised of an image correspondence processing device 1a and a contents creating device 1b. The image correspondence processing device 1a comprises: a moving image inputting section 101; a moving image storing section 102; an OHP file inputting section 103; an OHP file storing section 104; a frame acquiring section 105; an OHP region extracting section 106; an OHP acquiring section 107; a resemblance calculating section 108; a correspondence processing section 109; and a correspondence table 110.

The moving image inputting section 101 inputs a moving image obtained by photographing a lecture or the like to the apparatus 1 for allowing images to correspond to each other/creating contents. The moving image storing section 102 stores in an AVI form or the like the moving image inputted by the moving image inputting section 101. The OHP file inputting section 103 inputs any OHP files from other computer system to the apparatus 1 for allowing images to correspond to each other/creating contents. The OHP file storing section 104 stores therein an image file per page of the OHP file inputted by the OHP file inputting section 103 as well as its corresponding character information.

The frame acquiring section 105 acquires any frame image(s) of a plurality of continuous frames which constitute the moving image from the moving image storing section 102. In the frame acquiring section 105, there is included therein the OHP region extracting section 106 which searches in the frame image a region on which an image produced by the OHP is projected and extracts it. The OHP acquiring section 107 acquires an OHP image per page from the OHP file storing section 104. The resemblance calculating section 108 calculates a resemblance between the frame image of the moving image acquired from the frame acquiring section 105 and the OHP image acquired by the OHP acquiring section 107. The correspondence processing section 109 decides a correspondence between the frame image and the OHP image according to the resemblance calculated by the resemblance calculating section 108. The correspondence table 110 stores correspondences decided by the correspondence processing section 109.

On the other hand, the contents creating device 1b comprises: a contents creating section 111 and a contents storing section 112. The contents creating section 111 creates contents for us in the E-learning by looking-up the correspondences between the frame images and the OHP images from the correspondence table 110. The contents storing section 112 stores therein contents created by the contents creating section 111.

Figure 3:
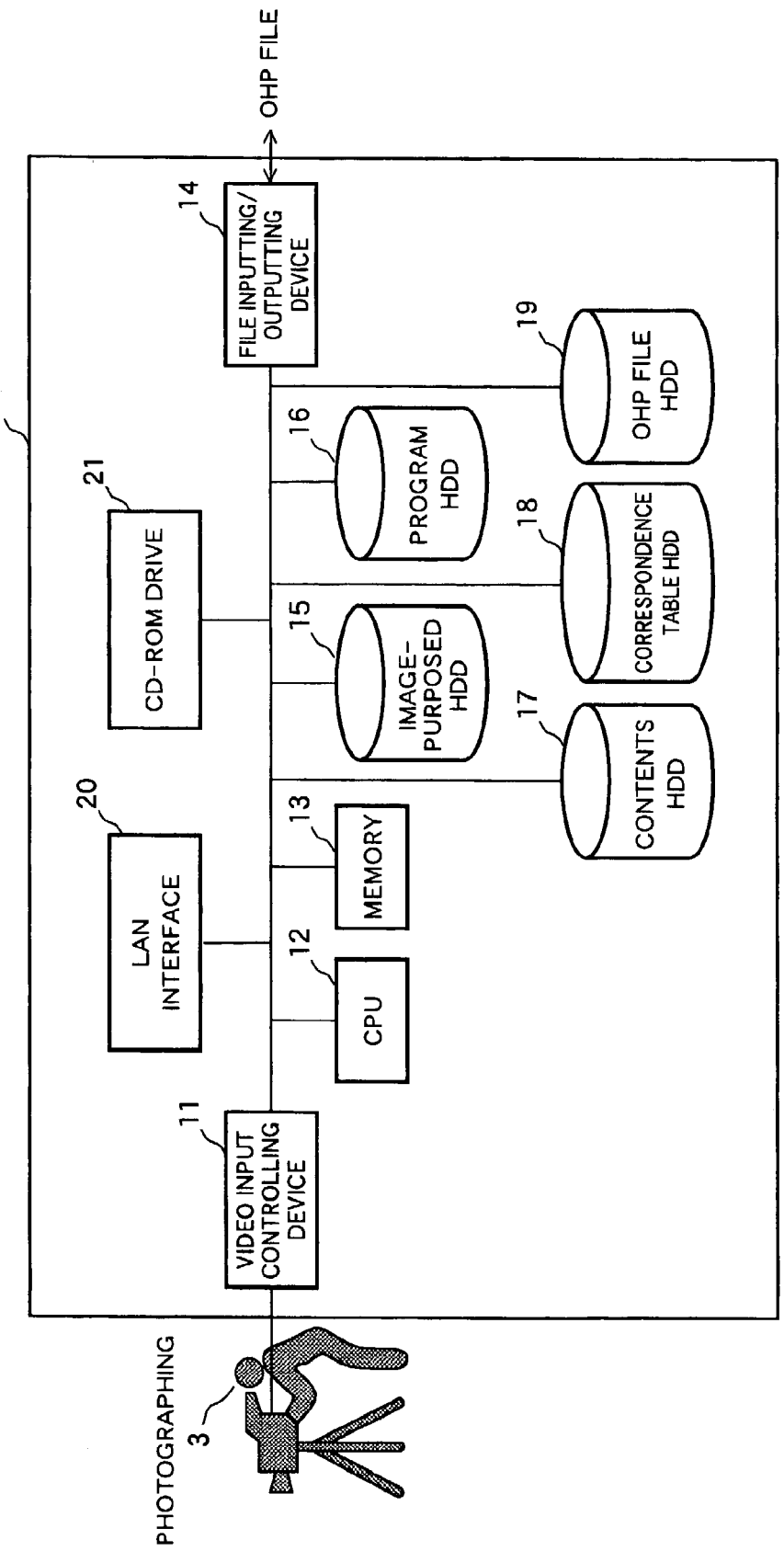
FIG. 3 is a schematic hardware configuration of the apparatus for allowing images to correspond to each other/creating contents.

FIG. 3 is a schematic diagram showing an example of hardware configuration of the apparatus 1 for allowing images to correspond to each other/creating contents. The apparatus 1 for allowing images to correspond to each other/creating contents of FIG. 3 comprises: a video input controlling device 11; a CPU (Central Processing Unit) 12; a memory 13; an image-purposed HDD (Hard Disk Drive) 15; a file inputting/outputting device 14; a program HDD 16; a contents HDD 17; a correspondence table HDD 18; an OHP file HDD 19; a LAN (Local Area Network) interface 20; and a CD-ROM drive 21.

In this embodiment, various function blocks as shown in FIG. 2 illustrate a state in which a program group stored in the program HDD 16 of FIG. 3 is developed on the memory 13 at the time of activation of the apparatus 1 for allowing images to correspond to each other/creating contents and executed by the CPU 12. However, the moving image inputting section 101 or the OHP file inputting section 103 of FIG. 2 can exhibit its function by cooperation of the video input controlling device 11 or the file inputting/outputting device 14 with the program group developed on the memory 13. Also, the moving image storing section 102 is implemented by the image-purposed HDD 15, the OHP file storing section 104 is implemented by the OHP file HDD 19, the correspondence table 110 is implemented by the correspondence table HDD 18, and the contents storing section 112 is implemented by the contents HDD 17.

It will be appreciated by those of ordinary skill in the art that the program group as mentioned above may be stored in any computer-readable medium readable such as a portable storage medium including either one of a CD-ROM, a flexible disk (FD), a magnetic disk, a DVD disk, an opto-magnetic disk, an IC card and the like, instead of the program HDD 16. In addition, the program group may be stored in a data base storing computer programs, the other computer or its data base, otherwise may be downloaded and developed on the memory 13 from a transmission medium on the transmission line for its execution. According to the present invention, the installing form of the program group is not limited to the program HDD 16. As described above, the apparatus 1 for allowing image to correspond to each other/creating contents also includes the CD-ROM drive 21 for data readable from a portable type storage medium. Furthermore, the apparatus 1 for allowing image to correspond to each other/creating contents can be configured to readily download the program group via LAN or the like from the other computer or from its data base by the provision of the LAN interface 20 or the file inputting/outputting device 14.

Figure 4:
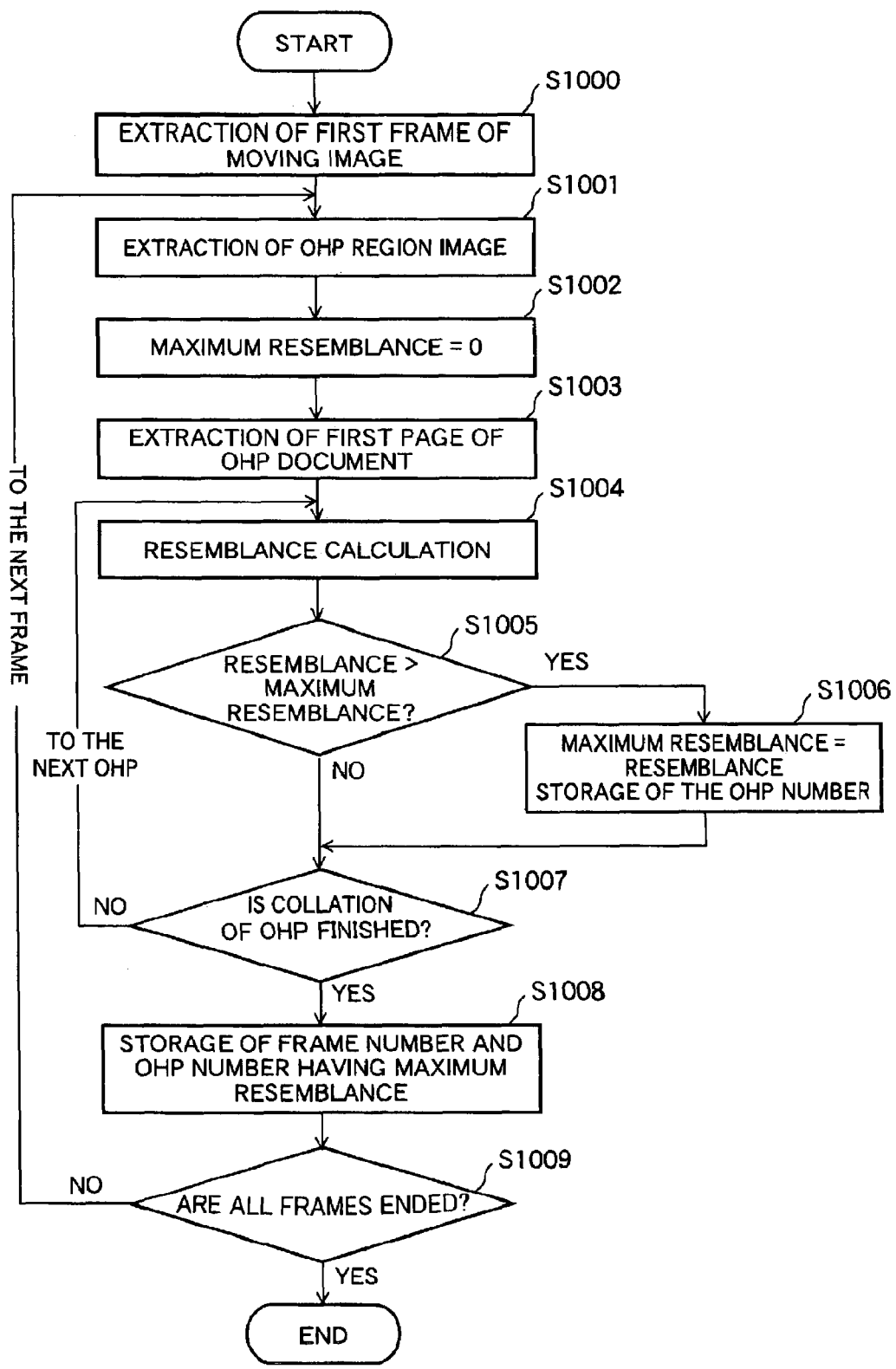
FIG. 4 is a flow chart showing a correspondence processing flow of the apparatus for allowing images to correspond to each other.

Hereinafter, the flow of a correspondence processing conducted by the correspondence processing device 1a will be described in detail with reference to a flow chart as shown in FIG. 4. FIG. 4 is the flow chart showing a process flow of the entire correspondence processing. First, the frame acquiring section 105 extracts a first frame image of a moving image from the moving image storing section 102 (S1000). The OHP region extracting section 106 searches in the extracted first frame image a region on which an image produced by the OHP is projected (hereinafter, referred to as a "OHP region image") and extracts it (S1001). The following description is provided to explain an extraction processing of the OHP region.

FIG. 5 is a flow chart showing a flow of the extraction processing of the OHP region image. First, a data of the frame image is inputted to the OHP region extracting section 106 (S1100). Then, the frame image is binarized and thereby any edges within the frame image is extracted (S1101). Subsequently, the Hough translation is applied to the extracted edges to extract straight lines (S1102). The extracted straight line components are integrated to form rectangles (S1103). From the rectangles, only a rectangle having a size larger than a predetermined size is extracted (S1104). In the event that any rectangles have not been extracted in this extraction processing (S1105: NO), the frame image overall is determined to be an OHP image and then that frame image is entirely extracted (S1107). In the event that any rectangles have been extracted in this extraction processing (S1105: YES), the largest rectangle among the extracted rectangles is extracted as an OHP region image (S1106).

It will be appreciated by those of ordinary skill in the art that, in a moving image obtained by photographing a lecture and like using the OHP, an image produced by the OHP among others is usually the largest rectangle. Therefore, that largest rectangle will be extracted in the processing of the S1106.

After extraction of the OHP region image, the maximum resemblance is set to 0 as an initial value (FIG. 4: S1002). Subsequently, the OHP acquiring section 107 extracts a first page of the OHP image from the OHP file storing section 104 (S1003). Then, the resemblance calculating section 108 collates the first page of the OHP image extracted in step of S1003 with the OHP region image which has been extracted from the frame image in step of S1001 to calculate a resemblance therebetween (S1004). The following description is provided to explain a resemblance calculation with reference to the drawings.

FIG. 6 is a block diagram showing an example of functional configuration of the resemblance calculating section 108. As shown in FIG. 6, the resemblance calculating section 108 comprises: an image normalizing section 120; a frame pixel extracting section 121; an OHP pixel extracting section 122; a pixel collating section 123; and a collation result adding section 124. The image normalizing section 120 executes a rotation processing of an OHP region image extracted from a frame image so as to coincide with a direction of the OHP image and then corrects an inclination of the OHP region image. Also, in the event that the OHP region image is different in size from the OHP image, an expansion processing is executed so as to correct the size of the OHP region image to be the same as that of the OHP image. In addition, such a normalizing processing is not limited as above and may be executed by the OHP region extracting section 106 at the time of the extraction in step of S1106 shown in FIG. 5.

The frame pixel extracting section 121 extracts pixels from the OHP region image extracted in step of S1106 of FIG. 5. Oppositely to the pixels in the OHP region image, the OHP pixel extracting section 122 extracts pixels from the page acquired by the OHP acquiring section 107. The pixel collating section 123 collates pixels extracted from the frame pixel extracting section 121 with pixels extracted from the OHP pixel extracting section 122. The collation result adding section 124 digitizes collation results obtained by the pixel collation section 123 and perform an addition of them, thereby providing the added result as a resemblance.

Figure 7:
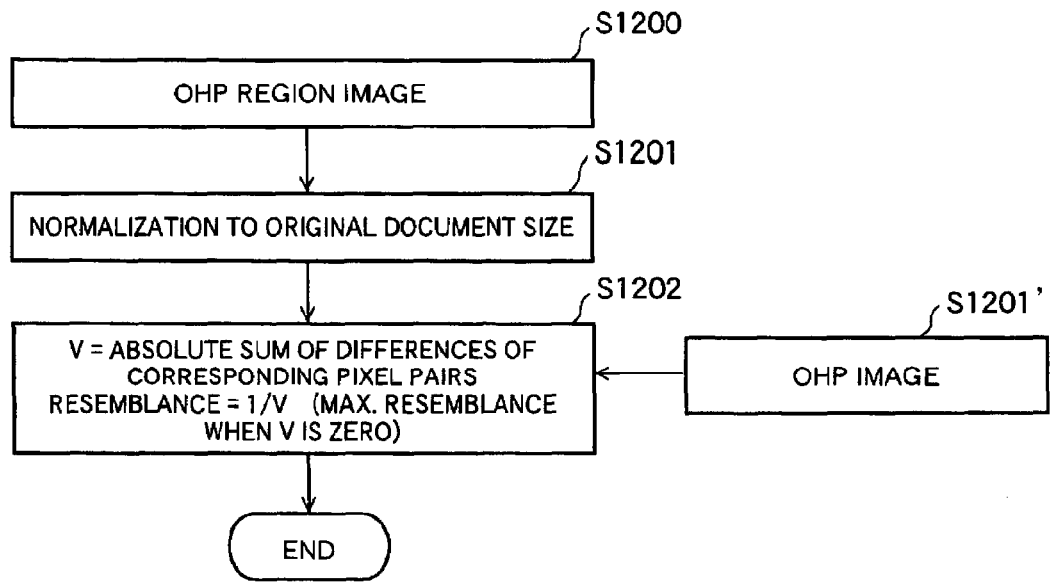
FIG. 7 is a flow chart showing a flow of a resemblance calculation processing executed by the resemblance calculating section of FIG. 6.

FIG. 7 is a flow chart showing a flow of a resemblance calculation processing executed by the resemblance calculating section 108 as above. First, the OHP region image is acquired from the frame acquiring section 105 (S1200). Then, the image normalizing section 120 normalizes the acquired OHP region image by expanding it to an original document size, i.e., a size of the OHP image (S1201). Simultaneously, the OHP image is acquired from the OHP acquiring section 107 (S1201'). Subsequently, the pixel collating section 123 collates pixels of the OHP region image extracted from the frame pixel extracting section 121 with pixels of the OHP image extracted from the OHP pixel extracting section 122 to seek a difference between each pair of their opposite pixels. The collation result adding section 124 adds these differences to calculate the resemblance (S1202). An example of formula for the resemblance calculation is provided as follows:

$$\text{RESEMBLANCE} = 1/V$$

(V=an absolute value of sum of differences of opposite pixels)

As the value V is smaller, so the resemblance is a higher value. In particular, if the value V is zero, it can be decided that the resemblance has unconditionally reached the maximum value.

The resemblance calculation is not limited to the above procedure. The following description is provided to explaining other procedure.

Figure 8:
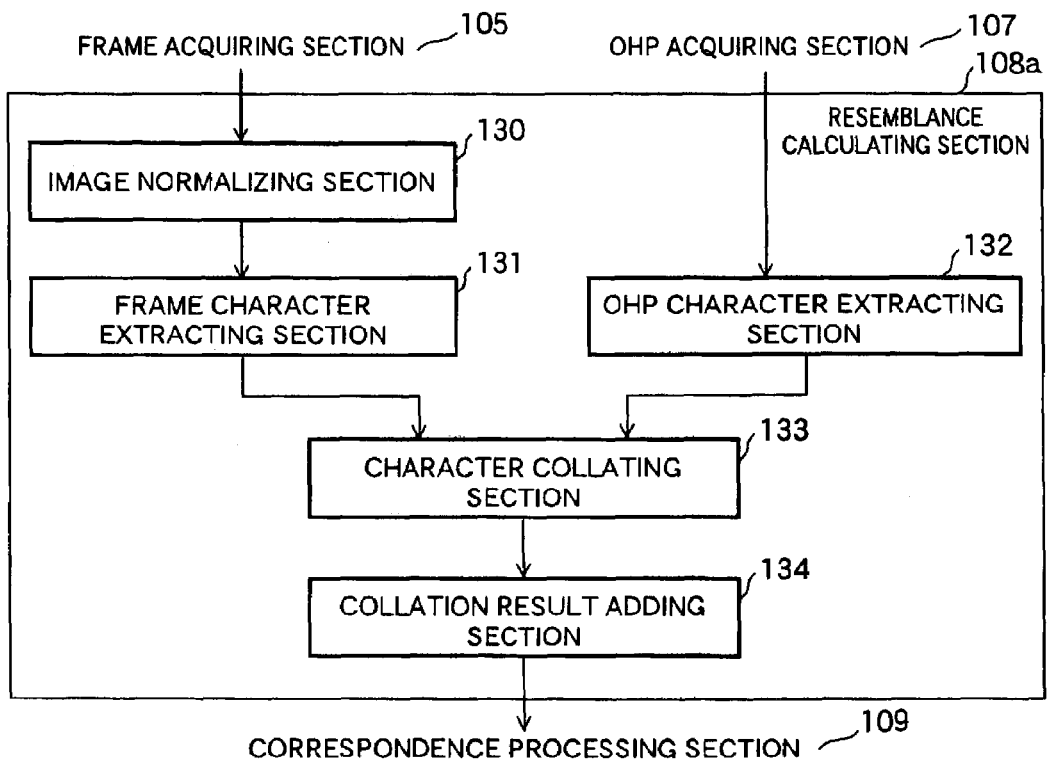
FIG. 8 is a schematic functional configuration of a resemblance calculating section adapted to calculate a resemblance in terms of character information.

FIG. 8 is a schematic block diagram showing a functional configuration of another resemblance calculating section 108a implementing the other procedure. This procedure calculates the resemblance by using character information. Here, the resemblance is calculated by performing the collation whether or not continuous two characters are identical to oppositely continuous two characters. In FIG. 8, the resemblance calculating section 108a comprises: an image normalizing section 130; a frame character extracting section 131; an OHP character extracting section 132; a character collating section 133; and a collation result adding section 134. The image normalizing section 130 functions in a similar manner to the image normalizing section 120 as shown in FIG. 6.

The frame character extracting section 131 recognizes and extracts characters from the OHP region image extracted in step of S1106 of FIG. 5. Oppositely to the characters extracted from the OHP region image, the OHP character extracting section 132 extracts characters from the page acquired by the OHP acquiring section 107. However, regarding the character information of the OHP image in this embodiment, since an image file per page and its corresponding character information have already been stored separately in the OHP file storing section 104, any character recognition processing is not required. Therefore, any character can be extracted merely by referring to the OHP file storing section 104. The character collating section 133 collates characters extracted by the frame character extracting section 131 with characters oppositely extracted by the OHP character extracting section 132. The collation result adding section 134 digitizes collation results obtained by the character collating section 133 and perform an addition of them, thereby providing the added result as a resemblance.

Figure 9:
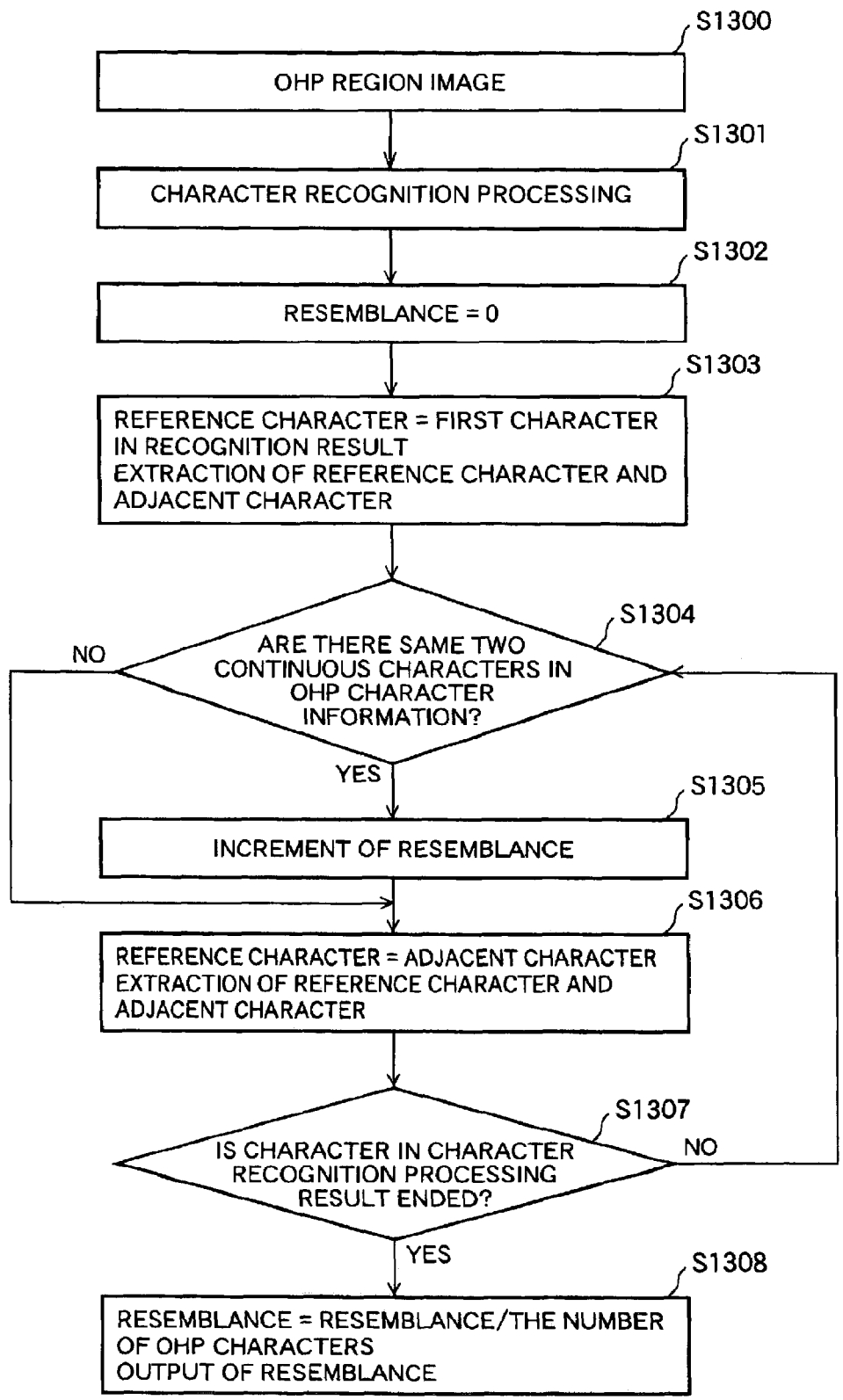
FIG. 9 is a flow chart showing a flow of a resemblance calculation processing executed by the resemblance calculating section of FIG. 8.
Figure 10:
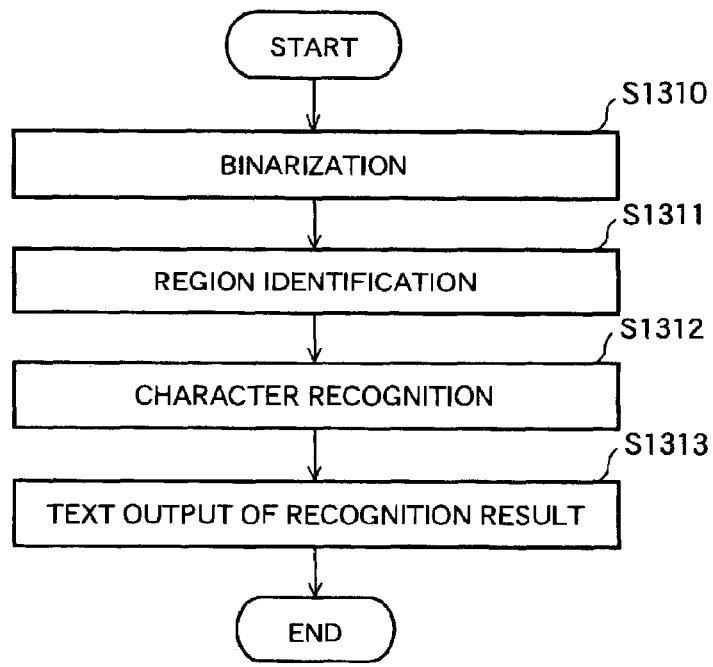
FIG. 10 is a flow chart showing details of a character recognition processing.

FIG. 9 is a flow chart showing a flow of a resemblance calculation processing executed by the resemblance calculating section 108a as above. First, the OHP region image is acquired from the frame acquiring section 105 (S1300) and then the character recognition processing thereof is executed by the frame character extracting section 131 (S1301). This character recognition processing is performed by a well-known technique. FIG. 10 is a flow chart showing details of this character recognition processing. First, an obtained OHP region image is binarized (S1310) to perform a region identification (S1311). Subsequently, the character recognition is performed (S1312), thereby providing a text output of its recognition result (S1313).

After the character recognition processing, an initial value of the resemblance is set to 0 (FIG. 9: S1302). Then, a first character in the recognition result obtained by the frame character extracting section 131 is set as a reference character. On the other, a character existing in the OHP image and disposed at a location corresponding to that of the reference character as set above and a character adjacent the former character are extracted by the OHP character extracting section 132 (S1303). At the character collating section 133, a character row recognized by the frame character extracting section 131 and a character row extracted by the OHP character extracting section 132 are compared to each other to perform the collate whether or not oppositely continuous two characters of respective character rows are identical to each other. If identical (S1304: YES), the collation result adding section 134 increments the resemblance (S1305). If not identical (S1304: NO), the resemblance is not incremented. Next, an adjacent character to the first character is set as a reference character and then a collation similar to that as above will be performed (S1306). The processing from step of S1304 to step of S1306 is repeated by a last character which can be obtained by the result of the character recognition processing (S1307: YES). Consequently, the resemblance is corrected, as follows, by the collation result adding section 134 (S1308).

RESEMBLANCE=RESEMBLANCE/the number of OHP characters

Figure 11:
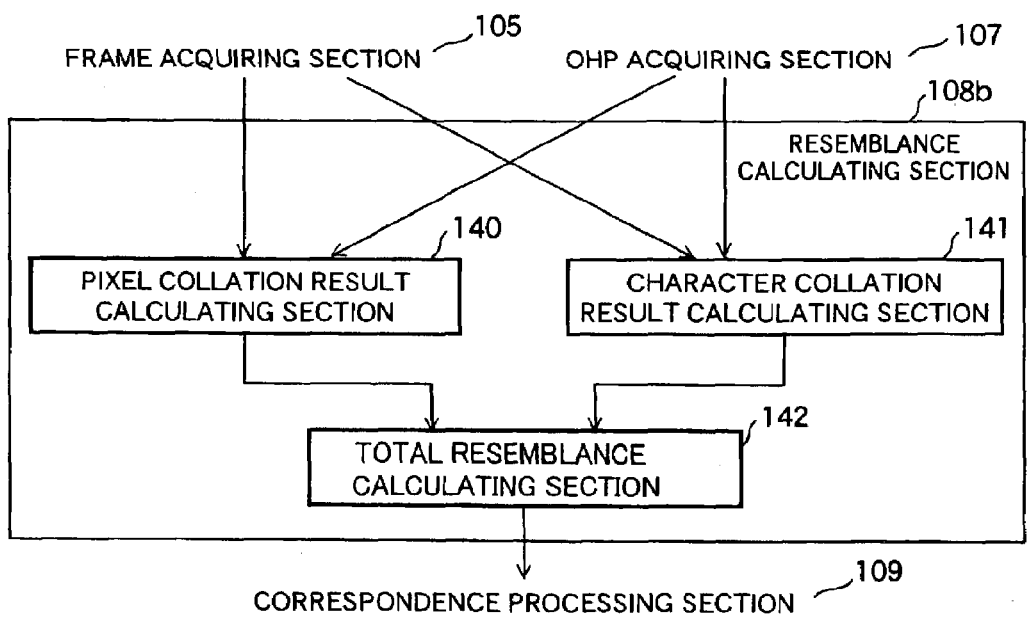
FIG. 11 is a schematic block diagram showing a functional configuration of a resemblance calculating section for calculating an overall resemblance by using both of the resemblance calculation processing in terms of pixels and the resemblance calculation processing in terms of characters.

It will be appreciated by those of ordinary skill in the art that an overall resemblance may be calculated by using both of the resemblance calculation processing using pixels as shown in FIG. 6 and the resemblance calculation processing using characters as shown in FIG. 8. FIG. 11 is a schematic block diagram showing a functional configuration of a resemblance calculating section 108b in order to implement such a procedure. In FIG. 11, the resemblance calculating section 108b comprises: a pixel collation result calculating section 140 having a resemblance calculation mechanism of FIG. 6; a character collation result calculating section 141 having a resemblance calculation mechanism of FIG. 8; and a total resemblance calculating section 142 for calculating an total resemblance by adding resemblances calculated by the two calculating sections as above.

Figure 12:
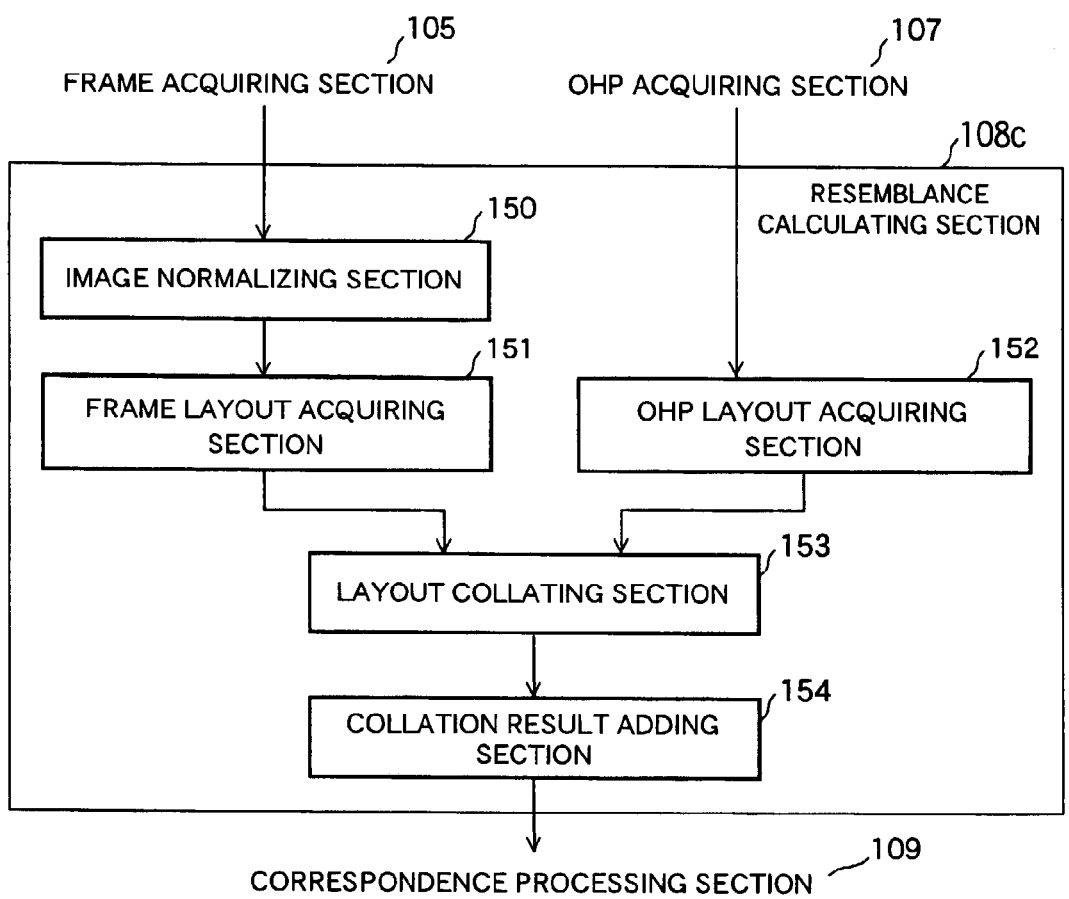
FIG. 12 is a schematic diagram showing a functional configuration of a resemblance calculating section for calculating a resemblance in terms of layout information.

In addition, the following description is provided to explain a procedure, other than the procedures as above, for the resemblance calculation using layout information. FIG. 12 is a schematic block diagram showing a functional configuration of a resemblance calculating section 108c for implementing such a procedure. In FIG. 12, the resemblance calculating section 108c comprises: an image normalizing section 150; a frame layout acquiring section 151; an OHP layout acquiring section 152; a layout collating section 153; and a collation result adding section 154. The image normalizing section 150 has a function similar to that of the image normalizing section 120 of FIG. 6.

The frame layout acquiring section 151 acquires layout information from the OHP region image extracted in step of S1106 of FIG. 5. The OHP layout acquiring section 152 acquires layout information from a page acquired by the OHP acquiring section 107. Hereinafter, a region attribution such as a figure (or diagram), a table and a block of character rows and its coordinate information are referred to as layout information. The layout collating section 153 collates the layout information acquired by the frame layout acquiring section 151 with the layout information acquired by the OHP layout acquiring section 152. The collation result adding section 154 digitizes collation results obtained by the layout collating section 153 and performs an addition of them, thereby providing the added result as a resemblance.

FIG. 13 illustrates an example of the layout information. FIG. 13(a) illustrates an OHP image having a region attribution which is acquired, as well as its coordinate information, by the OHP layout acquiring section 152. FIG. 13(b) illustrates an image captured from a frame image having a region attribution which is acquired, as well as its coordinate information, by the frame layout acquiring section 151.

In this procedure, the layout collating section 153 collates both layout information as above, as a result of which the collation result adding section 154 calculates the resemblance. In more detail, if the layout collating section 153 decides that both are mutually identical in region attribution and that an absolute value of difference of both region coordinates is smaller than a predetermined value, a pair of their regions can be regarded as being succeeded in correspondence. Every time a correspondence is succeeded a predetermined value is outputted to the collation result adding section 154 and added to a previously added value to finally provide the resemblance.

Figure 14A:
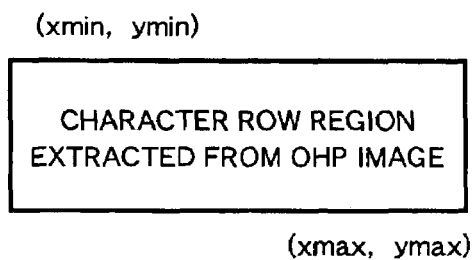
FIGS. 14(a) and 14(b) is a schematic diagram showing an example of a collating processing in terms of the layout information.
Figure 14B:
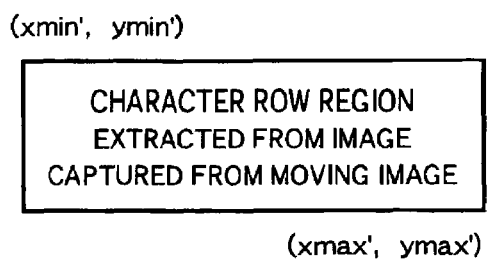

For example, on the assumption that a character row region extracted from the OHP image has a region coordinate of (xmin, ymin)-(xmax, ymax) as shown in FIG. 14(a) and that a character row region in the image captured from the moving image has a region coordinate of (xmin', ymin')-(xmax', ymax') as shown FIG. 14(b), the resemblance will be incremented if the following conditions are fulfilled ($\alpha$: a predetermined value).

|xmin-xmin'|<$\alpha$ and
|ymin-ymin'|<$\alpha$ and
|xmax-xmax'|<$\alpha$ and
|ymax-ymax'|<$\alpha$ The layout collating section 153 performs such a collation over all of the regions and makes a check on the region attribution and the coordinate difference. For example, if the conditions are fulfilled or not fulfilled, the layout collating section 153 outputs a value "1" or "0" to the collation result adding section 154 which adds it to previously added value. Specifically, in this procedure, the number of regions succeeded in correspondence can be the resemblance.

Figure 15A:
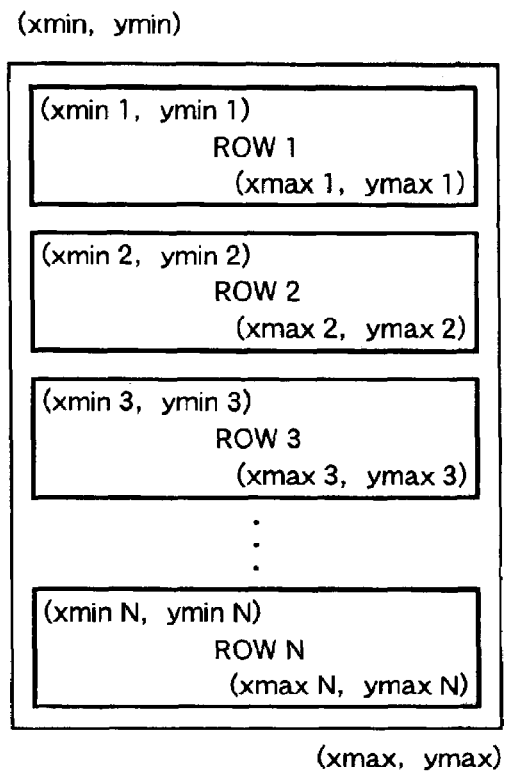
FIGS. 15(a) and 15(b) is a schematic diagram showing another example of the collating processing in terms of the layout information.
Figure 15B:
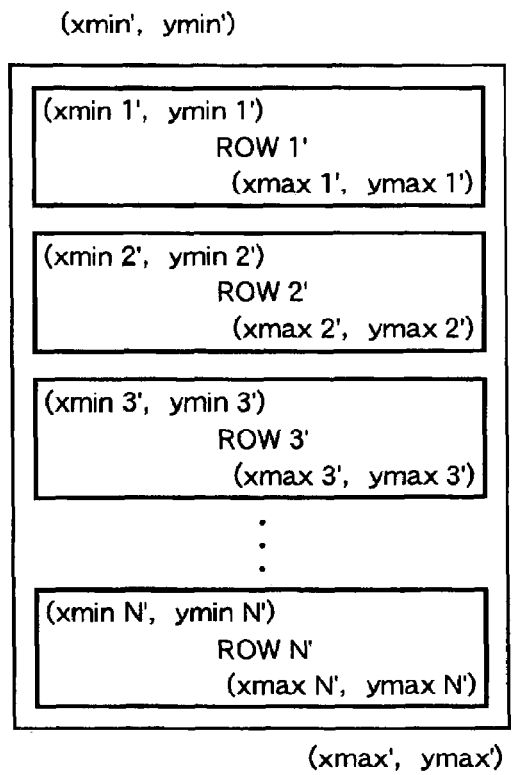

The following description is provided to explain a procedure, other than the procedure as above, for calculating the resemblance by collating a character row feature in addition to the layout information. The character row feature includes a coordinate of a rectangle of a character row which is obtained by dividing a block of character rows at a specific ratio or more, a character size of a character row, a shape of a character row, a color of a character row and the like. For example, as data of character row regions extracted from an OHP image shown in FIG. 15(a), a character row region having an area at a specific ratio or more within a certain character row region may be further divided into row1-rowN to be extracted for acquiring a coordinate per row as its character row information. Similarly, in the case of data of character row regions of an image captured from a moving image shown in FIG. 15(b), such a character row region may be further divided into row1'-rowN' to be extracted for acquiring a coordinate per row as its character row information. The opposite coordinates thus acquired will be collated with each other.

Then, the layout collating section 153 makes a check on whether a coordinate difference is less than a predetermined value ($\alpha$) at every row.

For example, a check is made whether the following conditions are fulfilled between the row1 and the row1':

|xmin1-xmin1'|<$\alpha$ and
|ymin1-ymin1'|<$\alpha$ and
|xmax1-xmax1'|<$\alpha$ and
|ymax1-ymax1'|<$\alpha$.

The layout collating section 153 performs such a collation over all of the rows. If the same conditions are fulfilled at all of the rows, a value "1" is outputted to the collation result adding section 154. If not, a value "0" is outputted to the collation result adding section 154. An addition of them is performed, thereby providing as a resemblance.

Figure 16A:
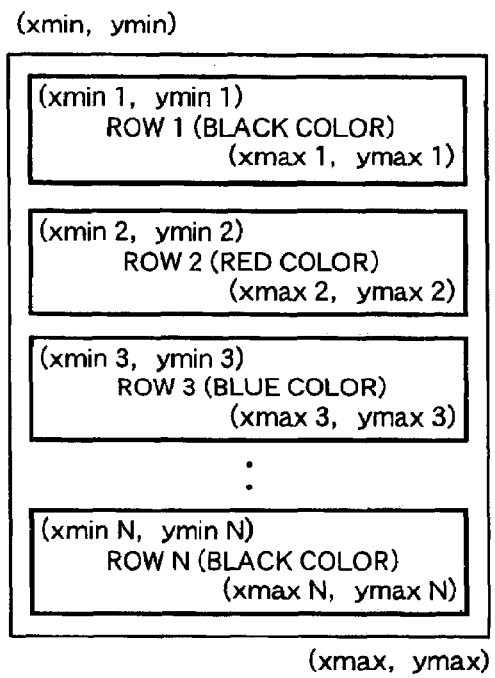
FIGS. 16(a) and 16(b) is a schematic diagram showing yet another example of the collating processing in terms of the layout information.
Figure 16B:
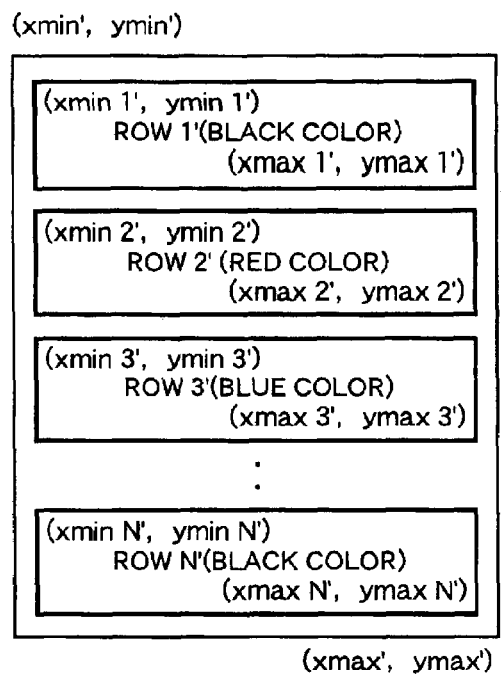

FIG. 16 illustrates an example of the layout information including color information of the character rows. FIG. 16(a) shows a data of a character row region extracted from an OHP image and FIG. 16(b) shows a data of a character row region captured from a moving image. As shown in FIGS. 16(a) and 16(b), a representative color per row is acquired as layout information, thereby executing a collation processing in consideration of such representative colors. In the event that there is a plurality of character colors in a single row, such colors are represented by a three-dimensional vector (R, G, B) and subjected to clustering processing so as to obtain a plurality of clusters which are mutually apart more than a predetermined value. Furthermore, an average color of their clusters is determined as a representative color in this case. These processing operations are executed in the frame layout acquiring section 151 or the OHP layout acquiring section 152.

Then, the layout collating section 153 makes, at every row, a check on whether a coordinate difference is less than a predetermined value ($\alpha$) and a check on whether a color difference is less than a predetermined value ($\beta$).

For example, a check is made whether the following conditions are fulfilled between the row1 and the row1':

|xmin1-xmin1'|<$\alpha$ and
|ymin1-ymin1'|<$\alpha$ and
|xmax1-xmax1'|<$\alpha$ and
|ymax1-ymax1'|<$\alpha$, and
and furthermore,
|R-R'|<$\beta$ and
|G-G'|<$\beta$ and
|B-B'|<$\beta$.

The layout collating section 153 performs such a collation over all of the rows. If the same conditions are fulfilled at all of the rows, a value "1" is outputted to the collation result adding section 154. If not, a value "0" is outputted to the collation result adding section 154. An addition of them is performed, thereby providing as a resemblance.

Figure 17:
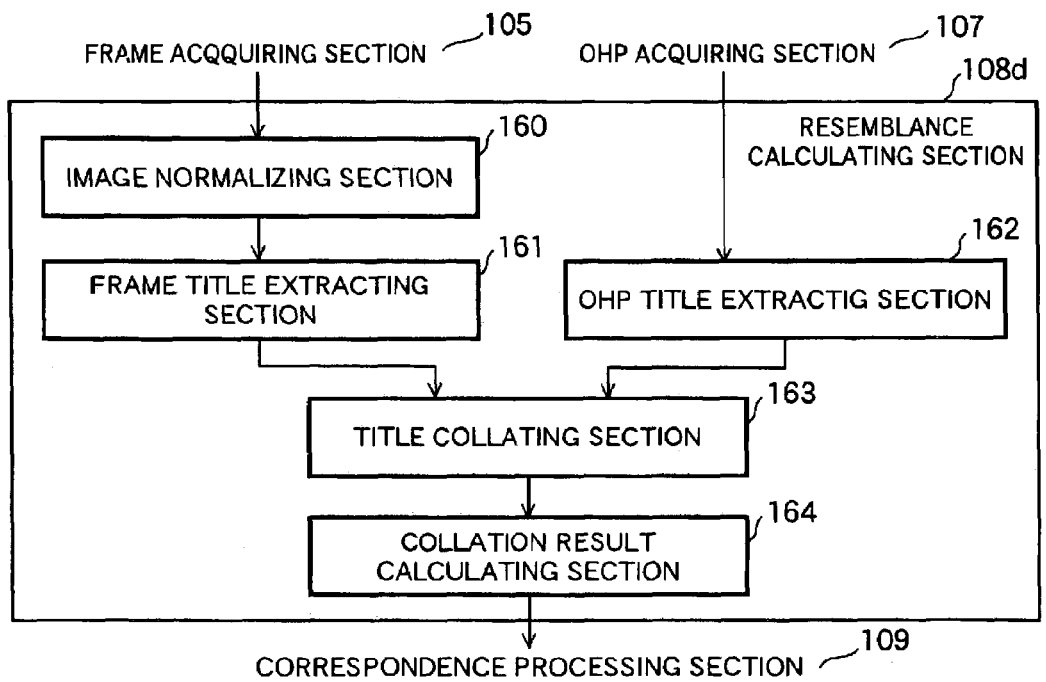
FIG. 17 is a schematic block diagram showing a functional configuration of a resemblance calculating section for calculating a resemblance by extracting title characters in an image.

Other than the procedures as above, a procedure for the resemblance calculation by extracting and collating only title characters in images may be used. FIG. 17 is a schematic block diagram showing a functional configuration of a resemblance calculating section 108d for implementing such a procedure. In FIG. 17, the resemblance calculating section 108d comprises: an image normalizing section 160; a frame title extracting section 161; an OHP title extracting section 162; a title collating section 163; and a collation result adding section 164.

The frame title extracting section 161 extracts a title from an OHP region image. The OHP title extracting section 162 extracts title information of a page acquired by the OHP acquiring section 107. The title collating section 163 collates the title obtained by the frame title extracting section 161 with that obtained by the OHP title extracting section 162. The collation result calculating section 164 digitizes collation results obtained by the title collating section 163 and calculates a resemblance.

Figure 18:
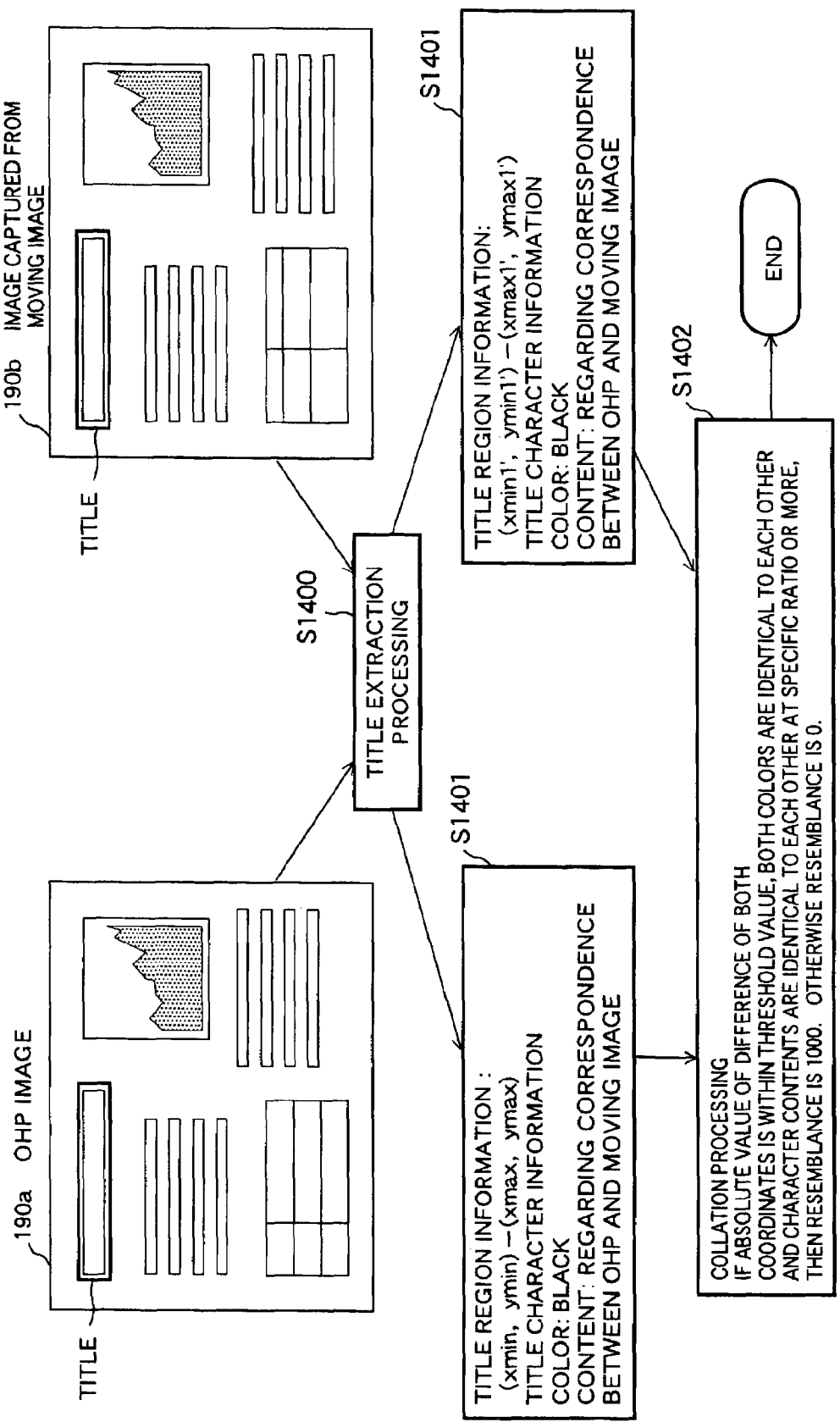
FIG. 18 is a flow chart specifying a title extraction processing and a title collation processing.

FIG. 18 is a flow chart specifying a title extraction processing and a title collation processing. First of all, the OHP title extracting section 162 and the frame title extracting section 161 extract character row regions from an image 190a created directly from the OHP and from an image 190b captured from a moving image, respectively, and then extract from the extracted plural character row regions character row regions of the largest size as respective titles (S1400). In this embodiment, the two extracted title information are shown in boxes of S1401 of FIG. 18. Then, the title collating section 163 performs a collation processing (S1402). At that time, if it is decided that an absolute value of difference of both coordinates is smaller than a predetermined value, both colors are identical to each other and both character contents are identical to each other at a specific ratio or more, then a signal "OK" is outputted to the collation result calculating section 164. Otherwise a signal "NG" is outputted to the collation result calculating section 164. Then, the collation result calculating section 164 digitizes such inputted values, thereby providing a resemblance of "1000" in the case of OK or a resemblance of "0" in the case of NG.

Figure 19:
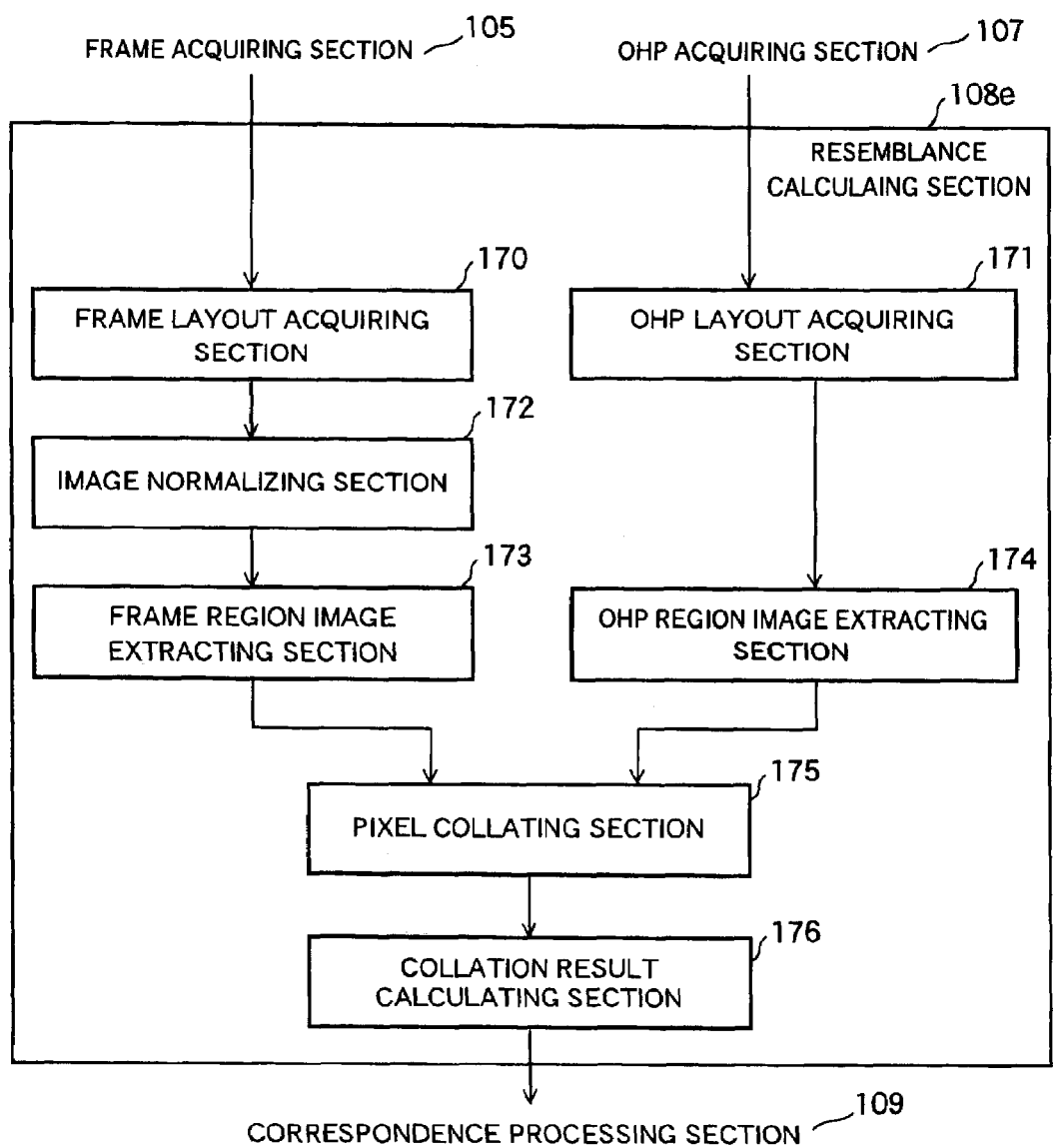
FIG. 19 is a schematic block diagram showing a functional configuration of a resemblance calculating section by integrating a procedure for acquiring and collating layout information and a pixel collating procedure.

A further procedure for calculating a resemblance by combining the procedure for acquiring and collating the layout information and the procedure for collating the pixels may be used. FIG. 19 is a schematic block diagram showing a functional configuration of a resemblance calculating section 108e for implementing such a procedure. An OHP layout acquiring section 171 acquires an image of one region, e.g., region I, extracted from an OHP image. Also, a frame layout acquiring section 170 acquires an image of one region, e.g., region J, in an image extracted from a moving image. After an image normalizing section 172 normalizes the region J to a size of the region I, a pixel collating section 175 collates pixels extracted by a frame region pixel extracting section 173 with pixels extracted by an OHP region pixel extracting section 174. Differences of opposite pixels are outputted to a collation result calculating section 176 that calculates a sum d of absolute values of such differences and then calculates a resemblance: 1/d.

In this way, such a resemblance may be calculated by various procedures, but the present invention is not intended that the resemblance calculation is limited to any one of the procedures. In particular, the resemblance calculation according to the present invention may be performed calculated by a combination of plural procedures as described above.

The above-mentioned resemblance calculating sections 108 to 108e (hereinafter referred to as the resemblance calculating section 108) calculates resemblances between an OHP region image of one frame and all of the OHP images. In detail, a resemblance between a first page of the OHP images and that OHP region image is firstly calculated (S1004). As a result, if that resemblance is decided to be more than the maximum resemblance (set to zero "0" at a first stage) (S1005: YES), then that resemblance is set to the maximum resemblance and that page number of the OHP image is stored (S1006). At this point, unless the collation processings between all pages of the OHP images and the OHP region image have not yet been finished or ended (S1007: NO), the next page of the OHP images is extracted such that the resemblance calculation processing in step of S1004 is repeated. If the collations between all pages of the OHP images and the OHP region image have been finished or ended (S1007: YES), the resemblance calculating section 108 outputs a frame number to be collated at that point and a page number of the OHP image having the maximum resemblance to the correspondence processing section 109 (S1008). However, at this point, unless the collations between all frames of the moving image and the OHP images have not yet been finished or ended (S1009: NO), the next frame image is extracted by the frame acquiring section 105 such that the processing from S1001 to S1009 is repeated.

When such collation processings for all of the frames have been finished, the correspondence processing section 109 will create a frame number-to-OHP number correspondence table (hereinafter, referred to as a "correspondence table") as shown in FIG. 20, in which respective frame numbers are listed together with their corresponding OHP numbers each having the highest resemblance. By using this frame number-to-OHP number correspondence, the correspondence processing section 109 creates a table, as shown in FIG. 21, that lists OHP images and corresponding frame ranges (or intervals) and is referred to as an "range correspondence table" hereinafter. In this way, if such a correspondence processing between an OHP image and a frame range of a moving image is performed, it promotes efficiency in creating contents for use in the E-learning.

It should be noted that entry numbers shown in FIG. 20 or FIG. 21 mean indexes affixed to respective records in FIG. 20 or FIG. 21.

Figure 22:
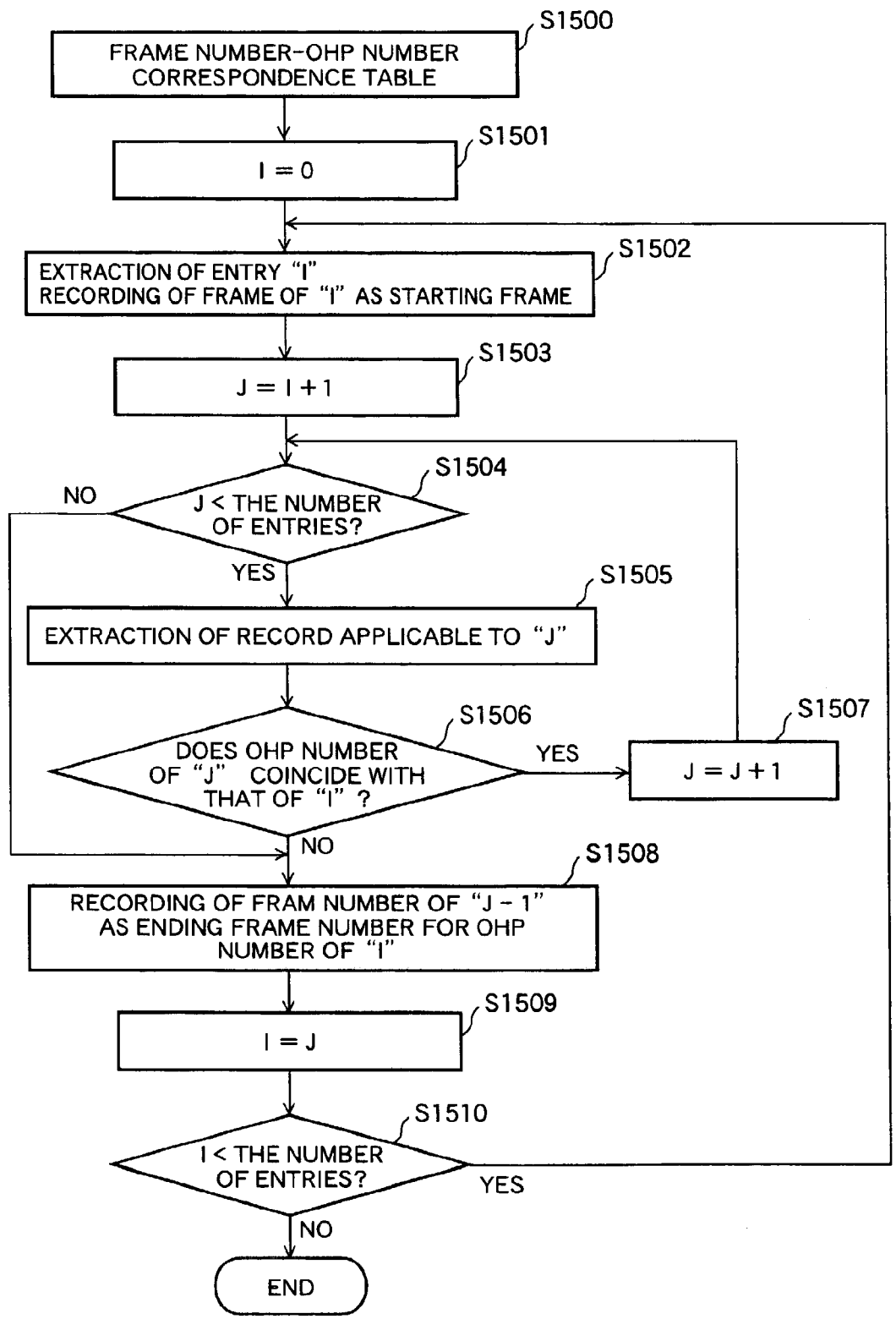
FIG. 22 is a flow chart showing details of a range correspondence creation processing.

FIG. 22 is a flow chart showing details of a range correspondence creation processing. In this flow chart, the entry number of FIG. 20 is counted by using "I" and "J". First of all, the correspondence table of FIG. 20 is read out (S1500). The "I" is set to zero (0) (S1501). Then, a record which is applicable to the entry "I" of the correspondence table is extracted. At this point in time, an extracted frame number is recorded as a starting frame number (S1502). Then, the "J" is set to I+1 (S1503). Thereupon, it is decided whether or not the "J" amounts to the number of entries, i.e., the number of "N" of FIG. 20 (S1504). If the "J" does not amount to the "N" (S1504: YES), then a record which is applicable to the "J" is extracted (S1505). At this point in time, it is decided whether or not an extracted OHP number of the "J" coincides with an OHP number of the "I" (S1506). If so (S1506: YES), the "J" is incremented (S1507) and a processing from step of S1504 to step of S1506 is repeated. With this repetitive processing, a record retrieval will be executed in order of the entry number. If the record retrieval reaches a specific record in which such an extracted OHP number of the "J" does not coincide with an OHP number of the "I" (S1506: NO), then it is decided that OHP images of the "J" and the "I" coincide with each other over a range from the starting frame number as above to a frame number in a previous record immediately before the specific record. Then, a frame number of the "J–1" is recorded as an ending frame number for the "I" (S1508).

In detail, since both of the frame numbers "0" and "1" are applicable to the OHP number "0" in the correspondence table of FIG. 20, the starting frame number for the OHP number "0" is "0" and the ending frame number for the same is "1".

Next, the "I" is set to "J", i.e., I=J (S1509). If the "I" does not amount to "N" (S1510: YES), a frame range applicable to the next OHP image number is retrieved. In this embodiment, since the "J" is set to "2" at this point in time, the "I" is set to "2". Then, the processing operations of step of S1502 and subsequent steps will be executed similarly as above. Since the frame number at the entry No. 2 is "2", a starting frame number "2" is recorded. Also, the record retrieval will be executed to retrieve an ending frame number with incrementing of the "J". Thus, the range correspondence table will be created as shown in FIG. 21.

Further, if an extreme short frame range exists in the range correspondence table thus created or OHP image numbers before and behind such an extreme short frame range are identical to each other, the correspondence processing in that frame range may be executed improperly. For example, in the event that OHP region images have not clearly been photographed due to an occurrence of temporary problems in a moving image, a proper resemblance calculation could not be performed so that an erroneous correspondence processing may be executed over such a section. In the case of a lecture moving-image, OHP images often are used in order of the page number. Accordingly, a correspondence result over the extreme short frame range as mentioned above can be decided to be improper. On the assumption that such a condition may be occurred, the correspondence processing section 109 in this embodiment of the present invention deletes or cancels correspondence entries over a short frame range and then unites two frame ranges before and behind the short frame range to form one continuous frame range having an appropriate correspondence.

Figure 23:
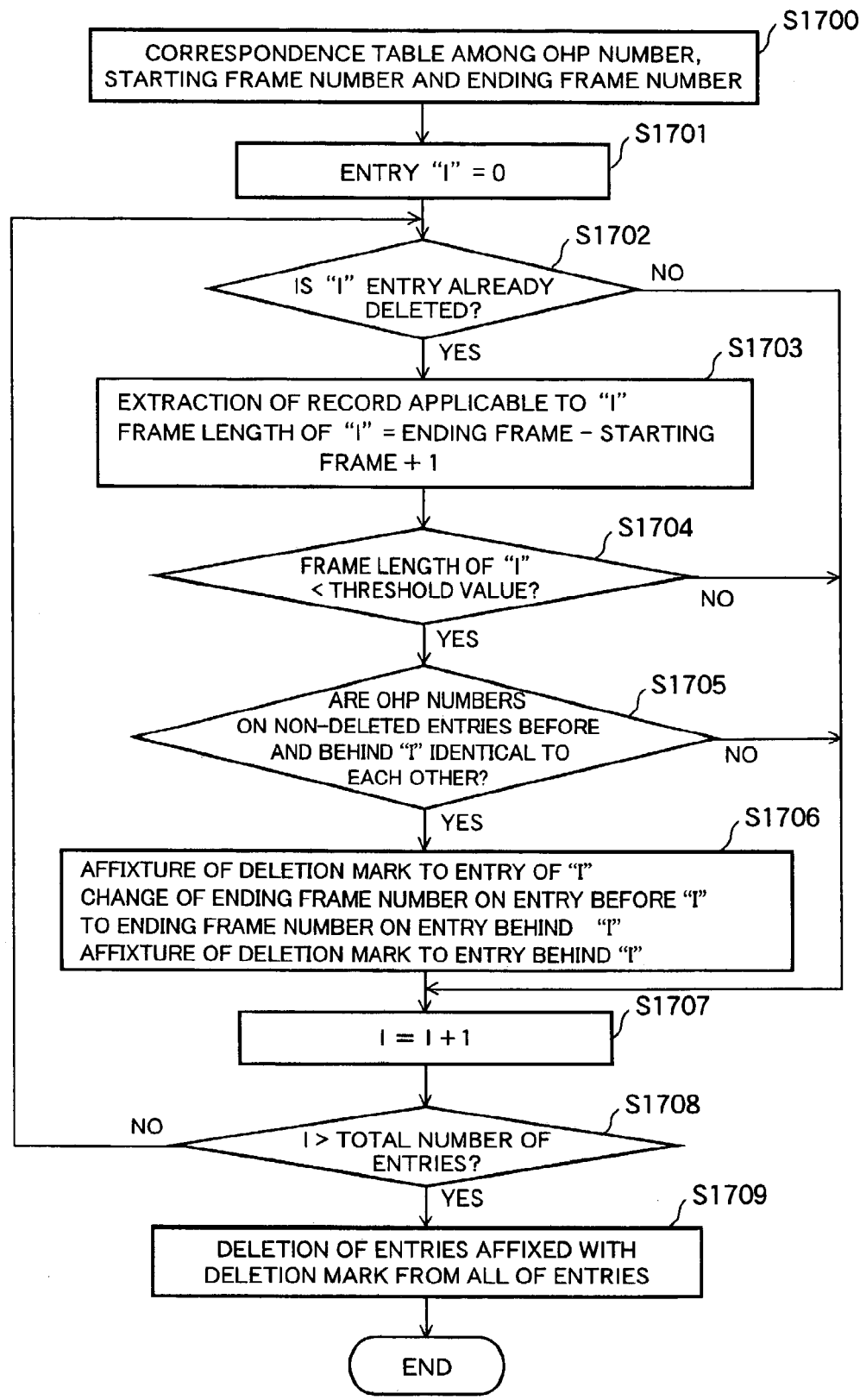
FIG. 23 is a flow chart showing a processing for integrating a frame range flow of such a correspondence change processing for deleting a range correspondence over a short frame range and then uniting two frame ranges before and behind that short frame range to form one continuous frame range having an appropriate correspondence.

FIG. 23 is a flow chart showing a flow of such a correspondence change processing. The following description is provided to explain this flow chart by using an "I" as the entry number of FIG. 21. First of all, the (frame) range table against OHP numbers is read out (S1700). Then, the "I" is set to zero (0) (S1701). Subsequently, it is decided whether or not the "I" is an entry number which has already been deleted in this correspondence change processing (S1702). If not (S1702: NO), a record applicable to the entry number "I" is extracted. Furthermore, a frame length applicable to the "I" is calculated as follows (S1703):

Frame Length applicable to "I"=Ending frame–Starting Frame+1

If the calculated frame length is less than a predetermined value (S1704: YES), it is verified whether OHP numbers of a non-deleted entry before and behind the "I" are identical to each other (S1705). If so (S1705: YES), an entry of the "I" is affixed to with a deletion mark and an ending frame number on the entry immediately before the "I" is changed to an ending frame number on the entry immediately behind the "I". Furthermore, the entry immediately behind the "I" is also affixed to with a deletion mark (S1706). With this deletion mark, the short frame range is united with frame ranges before and behind the short frame range such that records applicable to that short frame range and the immediately following frame ranges are finally deleted in the range correspondence table of FIG. 21. Then, the flow transits to the processing of step of S1707.

However, if the OHP numbers are not identical in step of S1705 to each other (S1705: NO), the flow immediately transits to step of S1707 and the following steps. In particular, the case where the OHP numbers are not identical to each other denotes the case where the correspondence is proper even if the frame range in question is shorter than the predetermined value.

After the "I" is incremented in step of S1707, a check is made whether the "I" exceeds the total number of entries (M). If the "I" is less than the total number of entries (S1708: NO), the processing of step of S1702 and the following steps are repeated so that all of the entries are checked on for their frame ranges and correspondences. If the "I" exceeds the total number of entries (S1708: YES), it is decided that all of the entries have been verified and then the entries affixed to with deletion marks are deleted (S1709).

The range correspondence table thus created is stored in the correspondence table 110 by the correspondence processing section 109. The contents creating device 1b refers to the correspondence table and creates contents for us in the E-learning by the existing technique, thereby storing it in the contents storing section 112.

As described above, it is enabled to automatically and readily perform the correspondence processing for making correspondence between the moving image and respective OHP images. Therefore, contents creation operation which has manually been conducted hitherto can rapidly and readily be conducted according to the present invention.

Embodiment 2

The following description is provided to explain an embodiment in which a further contrivance is added to the correspondence processing in conjunction with the functional configuration diagram of FIG. 2 and the hardware diagram of FIG. 3 which are used in the first embodiment. In this second embodiment, there is provided a threshold value for the resemblance. If there is a certain resemblance or more, the correspondence processing is executed similarly to that of FIG. 4 according to the first embodiment. However, if a frame image corresponds to any OHP page at a low resemblance, the frame image is allowed to correspond to OHP images which have corresponded to frame images immediately before and behind the frame image in question.

Hereinafter, details of the processing according to this second embodiment will be described with reference to the drawings.

Figure 24:
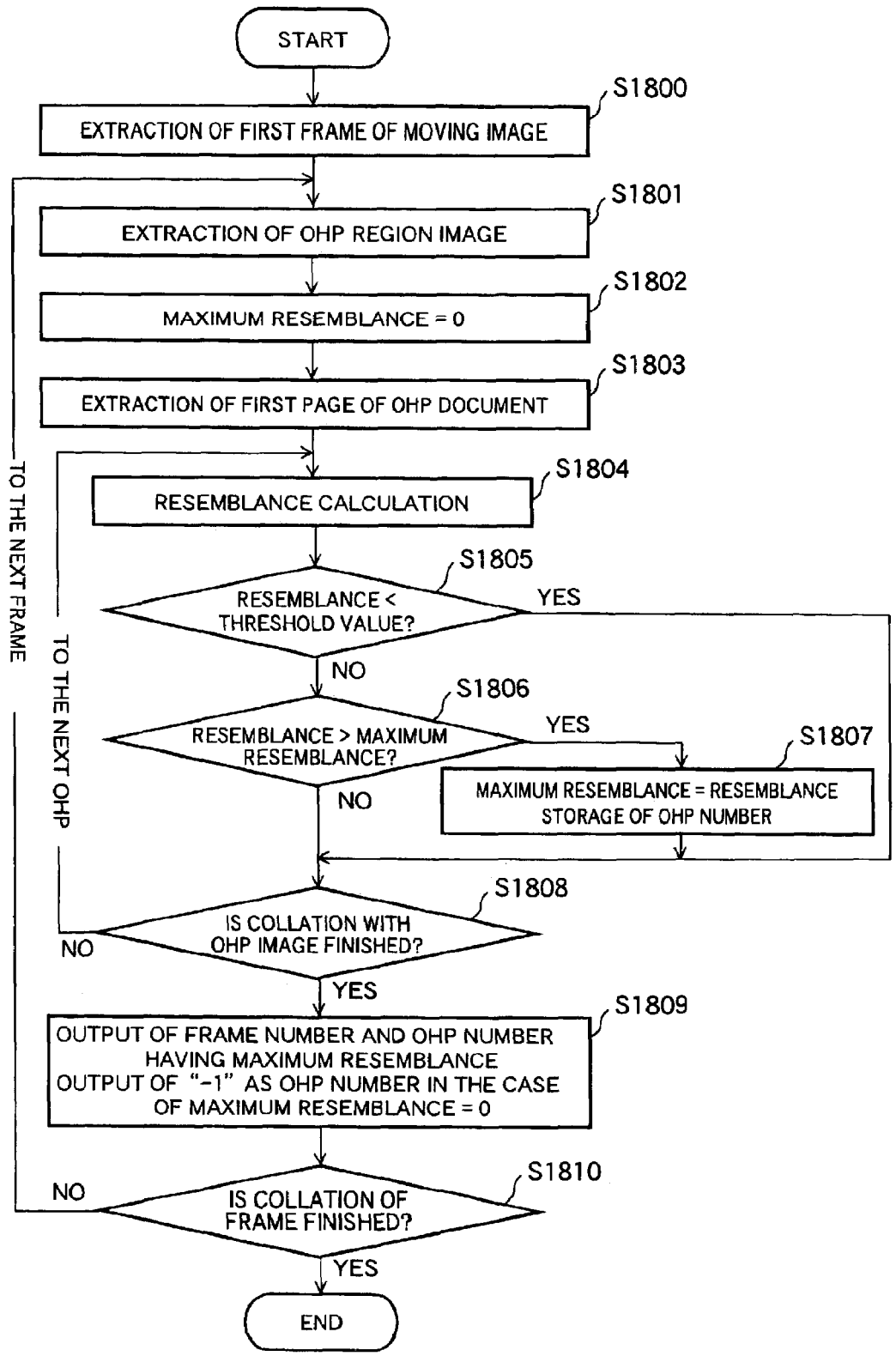
FIG. 24 is a flow chart showing a correspondence processing flow of an apparatus for allowing images to correspond to each other according to a second embodiment of the present invention.

FIG. 24 is a flow chart showing a flow of a correspondence processing of the image correspondence processing device 1a according to this embodiment.

Steps from S1800 to S1804 are similar to those in the first embodiment and therefore their explanations are omitted here. In the event that the resemblance is more than a predetermined value in step of S1805 (S1805: NO), the resemblance calculating section 108 performs a similar processing to that of the first embodiment (S1806-S1808). In the event that the resemblance is less than the predetermined value (S1805: YES), the maximum resemblance is not changed and the collation processing with the next OHP image is performed. Thus, the processing operations from S1804 to S1808 are performed with respect to all of the OHP images.

When the collation processing for one frame image is finished (S1808: YES), the resemblance calculating section 108 outputs a frame number as an object to be processed at that point and an OHP image number having the maximum resemblance to the correspondence processing section 109. However, in the event that the maximum resemblance is zero (0) at this point in time, it can be decided there is no corresponding OHP image, thereby outputting "−1" as an OHP number (S1809). As a result, an entry in which a frame number is "−1" appears in FIG. 20.

Figure 25:
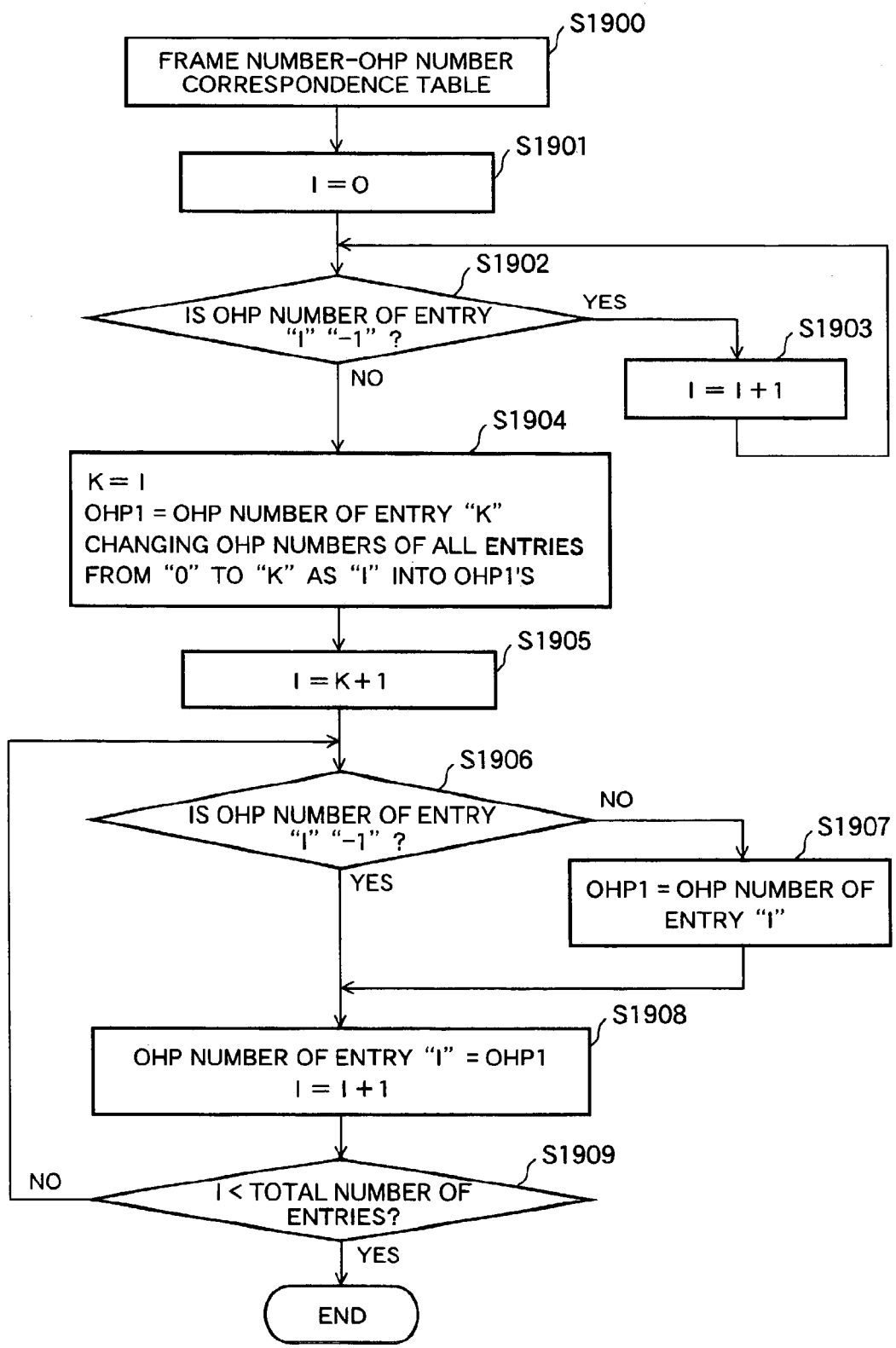
FIG. 25 is a flow chart showing a correspondence processing flow regarding frame numbers to which the correspondence processing has not been subjected with respect to OHP images based on calculated resemblances.

FIG. 25 is a flow chart showing a flow of a processing according to this second embodiment to be executed before a creation processing of the range correspondence table of FIG. 22 according to the first embodiment.

First of all, a correspondence table such as the correspondence table of FIG. 20 is read (S1900) and the entry "I" is set to zero (0). Then, the "I" is incremented by 1 (S1903) for sequential verification so as to search for an entry "I" thus incremented by 1 and having an OHP number other than "−1" (S1902). Then, the "I" of the entry "I" in which its OHP number is other than "−1" is set to a variable "K", the OHP number of the entry "K" is set to a variable OHP 1, and OHP numbers of all of entries from "0" to "K" as the "I" are changed into the OHP1's, respectively (S1904).

Then, the "I" is set to "K+1" (S1905) and subsequently the entry "I" in which its OHP number is "−1" is searched for (S1906). Then, if the OHP number of the entry "I" is not "−1" (S1906: NO), the variable OHP1 is set to the OHP number of the entry "I" (S1907). Furthermore, the OHP number of the entry "I" is set to the variable OHP1 and the "I" is incremented (S1908). If the OHP number of the entry "I" is "−1" (S1906: YES), the preset value OHP1 is set to the OHP number of the entry "I" and the "I" is incremented (S1908).

Thus, one OHP number applicable to a frame number, on a specific entry, which appears as "−1" in the correspondence table is replaced by another OHP number other than "−1" on an entry immediately before the specific entry (S1905 to S1908). In particular, if there is appears "−1" as an OHP number on an entry of the "I=0", an OHP number other than "−1" on the immediately following entry substitutes for the OHP number of "−1" (S1902 to S1904). This processing is repetitively continued until the "I" reaches the total number of entries.

In this way, the range correspondence table is completed by performing the range correspondence processing of FIG. 22 after deletion of the OHP number of "−1" from the correspondence table.

Embodiment 3

The following description is provided to explain another embodiment in which yet another contrivance is added to the correspondence processing in conjunction with the functional configuration diagram of FIG. 2 and the hardware diagram of FIG. 3 which are used in the first embodiment. In this third embodiment, instead of the collation of all of frame images with OHP images, a frame image which is extracted every a predetermined range is collated with OHP images and then all of frames existing between two frames corresponding to the same OHP image are allowed to correspond to the same OHP image, thereby providing an improvement in efficiency of the processing.

Figure 26:
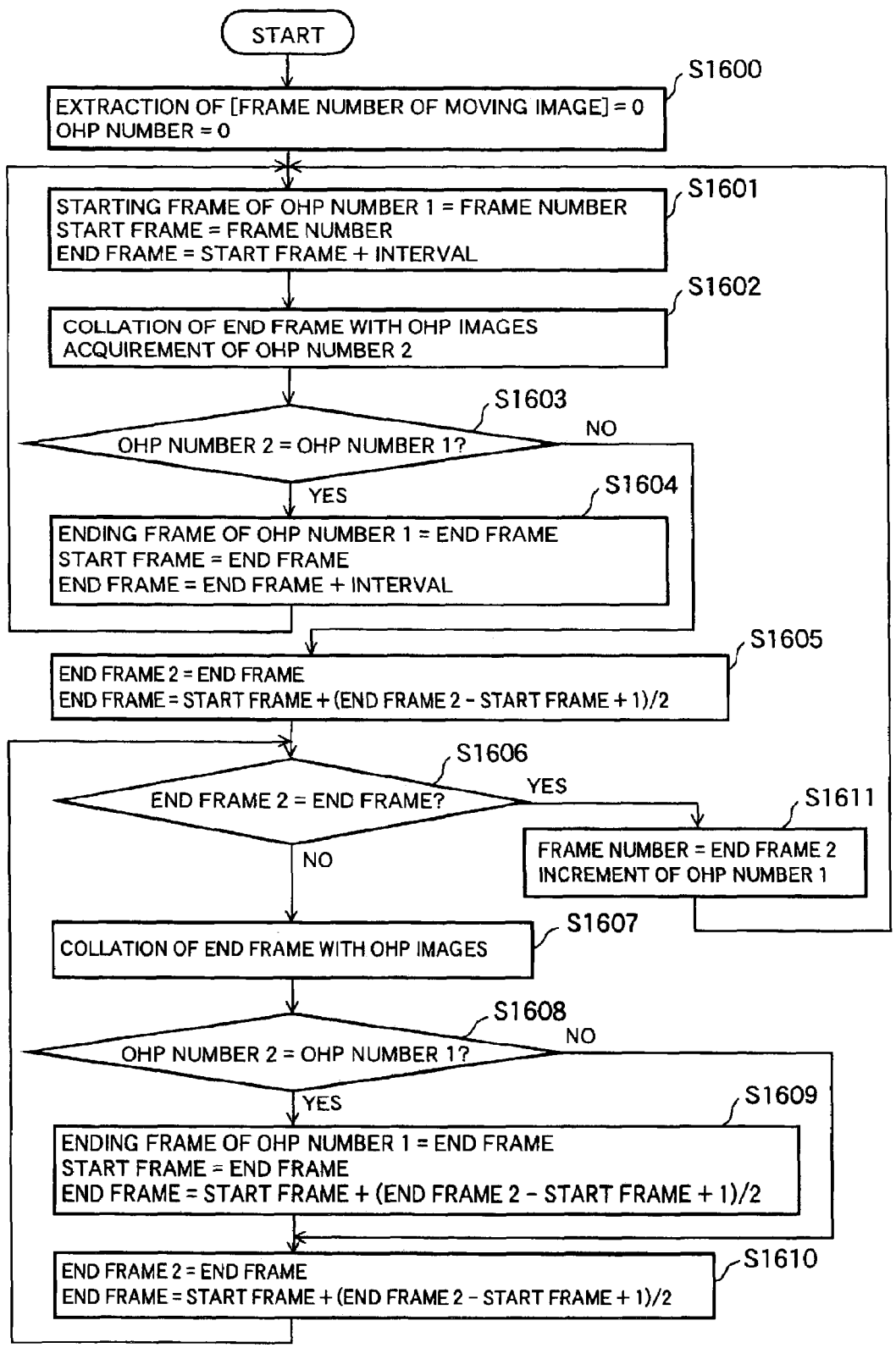
FIG. 26 is a flow chart showing a correspondence processing flow of an apparatus for allowing images to correspond to each other according to a third embodiment of the present invention.

FIG. 26 is a flow chart showing a flow of the correspondence processing of an image correspondence processing device 1a according to the third embodiment. FIG. 27 illustrates an example of a correspondence table resulted from a specific collation processing implemented along the lines of the flow chart of FIG. 26. In the corresponding table of FIG. 27, frame numbers are listed on an upper row while on a lower row are listed OHP numbers each having its maximum resemblance resulted from the collation of a frame image of its applicable frame number. In this corresponding table, OHP numbers each of which has already been confirmed as one corresponding to a frame image of its applicable frame number are listed as a matter of convenience, but these can be obtained by actually performing the collation processing and therefore are unknown before beginning of the collation processing.

Also, in the flow chart of FIG. 26, the extraction processing of a frame image is performed by the frame acquiring section 105 and the collation processing (resemblance calculation processing) is performed by the resemblance calculating section 108, but the remaining processings other than the former two processings are all performed by the correspondence processing section 109.

First of all, a first frame number (0) of a moving image is extracted and then a variable "OHP number 1" is set to zero "0" (S1600). Then, a variable "starting frame of OHP number 1" and a variable "Start frame" are set respectively to frame numbers ("0" at a starting time), and a variable "End frame" is set to a value obtained by adding a predetermined interval (INTERVAL) to the Start frame (S1601). Hereunder, the collation processing thereof is executed or initiated upon extraction of a frame every the INTERVAL (the predetermined interval).

In the corresponding table of FIG. 27, the INTERVAL is set to 5 and frame numbers to be extracted is indicated by downwardly pointed arrows. Also, in step of S1601, the Start frame is indicated by a frame number of column C1 and the End frame is indicated by a frame number of column C2.

Subsequently, the collation processing of the End frame (the extracted frame) with OHP images are performed (S1602). This collation processing is similar to that from S1001 to S1007 of FIG. 4 and therefore its explanation is omitted here. Also, the OHP number having the maximum resemblance resulted from this collation processing is set to an "OHP number 2" (S1602).

Then, it is verified whether or not the OHP number 2 and the OHP number 1 are equal to each other. In the case of the corresponding table of FIG. 27, both of the OHP numbers are equal to "0" (S1603: YES) and then the "End frame" is set on an "ending frame of the OHP number 1" and the "Start frame", respectively while a value obtained by adding the INTERVAL to the current End frame is set on the "End frame" (S1604). At this point in time, the "Start frame" becomes the frame number on a location indicated by the C2 while the "End frame" becomes a frame number on a location indicated by column C3.

Subsequently, the flow returns to step of S1602 through S1601 and then the collation processing is again performed. As long as the OHP number 1 and the OHP number 2 are equal to each other, the processing from S1602 to S1604 are repeated. In an example (C2 and C3) as shown in FIG. 27, the OHP number 1 is "0" and the OHP number is "2" and therefore they are not equal to each other (S1603: NO), the flow transits to the processing in step of S1605. In step of S1605, a variable "End frame 2" is set to the End frame obtainable at that point in time, and ["Start frame"+("End frame 2"−"Start frame"+1)/2] is set on the "End frame". That is, a frame on a location obtainable by dividing the INTERVAL by 2 becomes the next "End frame". It should be noted that [("End frame 2"−"Start frame"+1)/2] is rounded down below the decimal place. In the example as shown in FIG. 27, the "End frame" becomes a frame number on a location indicated by column C4.

Then, a check is made whether or not the "End frame 2" is equal to the "End frame" (S1606). If not, the "End frame" at this point in time is collated with OHP images (S1607). A corresponding OHP number resulted from this collation processing is set on the OHP number 2. Here, it is verified whether or not the OHP number 2 is equal to the OHP number 1 (S1606). In the example as shown in FIG. 27, the OHP number 1 becomes "0" while the OHP number 2 becomes 1, and therefore they are not equal to each other (S1608: NO), so that the flow transits to the processing of S1610. In step of S1610, the "End frame 2" is set to the "End frame" and the "End frame" is set to ["Start frame"+("End frame 2"−"Start frame"+1)/2]. At this point in time, the End frame becomes a frame number on a location indicated by column C5.

Next, the flow returns to step of S1606, a check is again made whether or not the End frame 2 is equal to the End frame. In the example as shown in FIG. 27, the End frame 2 at this point in time is "8" and the End frame is "7" (S1606: NO), so that the collation processing is performed in step of S1607. As a result, the OHP number 2 and the OHP number 1 are equal to each other (S1608: YES), the flow transits to the processing of S1609. In step of S1609, the "ending frame of OHP number 1" and the "Start frame" is respectively set to the End frame and the "End frame" is set to ["Start frame"+("End frame 2"−"Start frame"+1)/2].

At this point in time, the start frame number is set to "0" while the ending frame number is set to "1". These values are outputted to entries having the OHP number=0 in the section correspondence table. Further, since each of the End frame 2 and the End frame becomes 7 (S1606: YES), the flow transits to step of S1611 after step of S1606 and then the frame number is set to the End frame 2 while the OHP number 1 is incremented, thereafter returning the flow to step of S1601.

In this way, the processing as described above is repeated, without the collation of all of frame images with OHP images, so as to obtain the section correspondence table as shown in FIG. 21 and enable the frames to correspond to appropriate OHP images.

In order to create contents for use in the E-learning so as to enable a moving image of a lecture or the like conducted by using an OHP to correspond to an OHP image which is projected in the moving image for displaying them in synchronization with each other, such a correspondence processing has manually been conducted by using a contents creation-purposed authoring system. However, the present invention realizes that this correspondence processing can automatically be performed without expense in time and effort, thereby providing a significant reduction of time required for the correspondence processing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for allowing images to correspond to each other, comprising:
   means for deciding which of a plurality of first images has a predetermined relevance to each of a plurality of second images, at least one of said second images having said predetermined relevance to any one or more of said first images; and
   means for making correspondence between said any one or more of said first images, which have been decided as having the predetermined relevance by said relevance deciding means, and each of said second images,
   wherein, in the event that said predetermined relevance resides in that any one of said first images is included in any one of said second images, said deciding means comprises:
   predetermined region extracting means for extracting a predetermined region from said second image; and corresponding image deciding means for deciding which of said first images corresponds to an image of said predetermined region extracted by said predetermined region extracting means;

wherein said corresponding image deciding means comprises resemblance calculating means for calculating a resemblance between said predetermined region image and said first images, and is adapted to decide which of said first images corresponds to said predetermined region image based on resemblances calculated by said resemblance calculating means;

wherein said resemblance calculating means comprises character recognizing means for recognizing characters included in an image, said resemblance calculating means is adapted to calculate said resemblance based on second characters recognized in said image of said predetermined region which is extracted from said second image by said predetermined region extracting means and first characters recognized, oppositely to the second characters, in said first image; and wherein said resemblance calculating means is adapted to perform a collation of all pairs of opposite characters recognized on mutually corresponding locations in said predetermined region and said first image, thereby calculating the resemblance based on a collation result.

2. An apparatus for allowing images to correspond to each other, comprising:

means for deciding which of a plurality of first images has a predetermined relevance to each of a plurality of second images, at least one of said second images having said predetermined relevance to any one or more of said first images; and means for making correspondence between said any one or more of said first images, which have been decided as having the predetermined relevance by said relevance deciding means, and each of said second images, wherein, in the event that said predetermined relevance resides in that any one of said first images is included in any one of said second images, said deciding means comprises:

predetermined region extracting means for extracting a predetermined region from said second image; and corresponding image deciding means for deciding which of said first images corresponds to an image of said predetermined region extracted by said predetermined region extracting means;

wherein said corresponding image deciding means comprises resemblance calculating means for calculating a resemblance between said predetermined region image and said first images, and is adapted to decide which of said first images corresponds to said predetermined region image based on resemblances calculated by said resemblance calculating means;

wherein said resemblance calculating means comprises character recognizing means for recognizing characters included in an image, said resemblance calculating means is adapted to calculate said resemblance based on second characters recognized in said image of said predetermined region which is extracted from said second image by said predetermined region extracting means and first characters recognized, oppositely to the second characters, in said first image; and wherein said resemblance calculating means is adapted to perform a collation of all pairs of oppositely continuous predetermined-number characters recognized on mutually corresponding locations in said predetermined region and said first image, thereby calculating the resemblance based on a collation result.

* * * * *